United States Patent

[11] 3,588,875

[72] Inventor William D. Gabor
Amherst, N.H.
[21] Appl. No. 598,558
[22] Filed Oct. 10, 1966
[45] Patented June 28, 1971
[73] Assignee Sanders Associates, Inc.
Nashua, N.H.
Continuation-in-part of application Ser. No. 496,031, Oct. 14, 1965, now abandoned.

[54] CHARACTER ENCODER
32 Claims, 25 Drawing Figs.

[52] U.S. Cl. .......... 340/347, 340/365
[51] Int. Cl. .......... H04l 3/00, H03k 13/243, H03k 13/256
[50] Field of Search .......... 340/347, 365, 174; 178/17 (D), 178 (C), 178 (A), 66 (A)

[56] References Cited

UNITED STATES PATENTS

| | | | |
|---|---|---|---|
| 3,129,418 | 4/1964 | DeLa Tour | 340/365X |
| 3,366,808 | 1/1968 | Steward | 178/17X |

OTHER REFERENCES

Non-Mechanical Keyboard, W. A. Goddard, IBM TECH. DISCLOSURE, Vol. 3, No. 11, April 1961, p. 31

Non-Mechanical Keyboard, J. J. Sharp, IBM TECH. DISCLOSURE, Vol. 5, No. 12 May 1963, p. 22

Cathode Ray Tube Decimal to Binary Converter, H. W. Cochrane, IBM TECH. DISCLOSURE, Vol. 2, No. 4, December 1959, pp. 53— 54

*Primary Examiner*—Maynard R. Wilbur
*Assistant Examiner*—Gary R. Edwards
*Attorney*—Louis Etlinger ABSTRACT: A keyboard encoder comprises a set of keys. Each key is in juxtaposition with one or more field-responsive elements associated with that key, the outputs of the field-responsive elements being conveyed to output terminals of the encoder. Actuation of a key alters the field to which the elements associated therewith respond. The number of elements associated with each key and the connections of these elements to the output terminals correspond to the output code for the character represented by the key. Consequently, the responses of the field-responsive elements to actuation of a key provide a directly encoded representation of the corresponding character at the output terminals.

INVENTOR.
WILLIAM D. GABOR
BY
ATTORNEY

INVENTOR.
WILLIAM D. GABOR
BY
ATTORNEY

INVENTOR.
WILLIAM D. GABOR
BY
ATTORNEY

INVENTOR.
WILLIAM D. GABOR
BY
ATTORNEY

INVENTOR.
WILLIAM D. GABOR
BY
ATTORNEY

INVENTOR.
WILLIAM D. GABOR
BY
ATTORNEY

INVENTOR.
WILLIAM D. GABOR
BY
ATTORNEY

INVENTOR
WILLIAM D. GABOR
BY
ATTORNEY

INVENTOR.
WILLIAM D. GABOR,
BY
ATTORNEY

INVENTOR.
WILLIAM D. GABOR
BY [signature]
ATTORNEY

INVENTOR.
WILLIAM D. GABOR
BY
ATTORNEY

INVENTOR.
WILLIAM D. GABOR
BY Louis Etlinger
ATTORNEY

INVENTOR.
WILLIAM D. GABOR
BY
ATTORNEY

INVENTOR.
WILLIAM D. GABOR
BY [signature]
ATTORNEY

CHARACTER ENCODER

This application is a continuation-in-part of my copending application Ser. No. 496,031, filed Oct. 14, 1965, now abandoned, for Keyboard Encoder.

This invention relates to a compact keyboard encoder having no moving parts except for the keys themselves. Actuation of a key changes an electrical characteristic of one or more sensors according to the coded representation of a character associated with the key. Converters in the encoder transform these changes in the characteristic to digital signals identifying the character.

A digital encoder of the type having a keyboard input provides the link between a human operator and automatic data processing equipment. The keyboard appears similar to a typewriter keyboard and for each keyboard character selected by the operator, the encoder produces a series of electrical signals corresponding to the digits in a coded representation of the character. In an illustrative application, the operator uses the keyboard to type computer instructions and input data. The encoder converts the selected characters to their corresponding digital signals, which are then recorded on a magnetic tape or on a series of punched cards.

Many prior keyboard encoders employ keyboards having mechanical linkages similar to those in conventional office typewriters or teletype machines. High operating noise and relatively frequent maintenance, due to wear and maladjustment, restrict the performance of such mechanical encoders.

Electrical switches having moving contacts are also used in prior keyboard encoders. However, dirt on the contacts and contact oxidation and wear cause mechanical switches to have varying nonzero resistances between engaged contacts. As a result, encoders employing moving contacts have limited reliability and their performance often deteriorates with age as well as with use.

A further disadvantage of prior keyboard encoders is their relatively large size and high cost.

Accordingly, it is an object of the present invention to provide a compact, high performance keyboard encoder characterized by relatively low cost.

Another object of the invention is to provide an encoder of the above type characterized by the absence of mechanical linkages and moving electrical contacts.

A further object of the invention is to provide an encoder of the above type characterized by high reliability. A more specific object of the invention is to provide a keyboard encoder whose output signals are relatively free from errors and which is capable of prolonged use with minimal maintenance.

A still further object of the invention is to provide a keyboard encoder characterized by simplicity of design and low-cost fabrication.

Other objects of the invention will in part be obvious and will in part appear hereinafter.

The invention accordingly comprises the features of construction, combinations of elements, and arrangements of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which.

Figure 15:
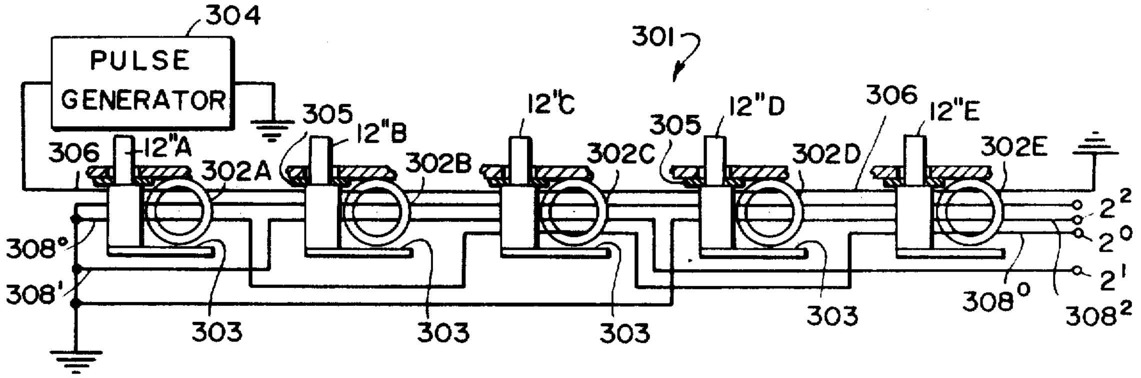
FIG. 15 is a schematic diagram of a keyboard encoder incorporating the preferred embodiment of the invention.
Figure 18:
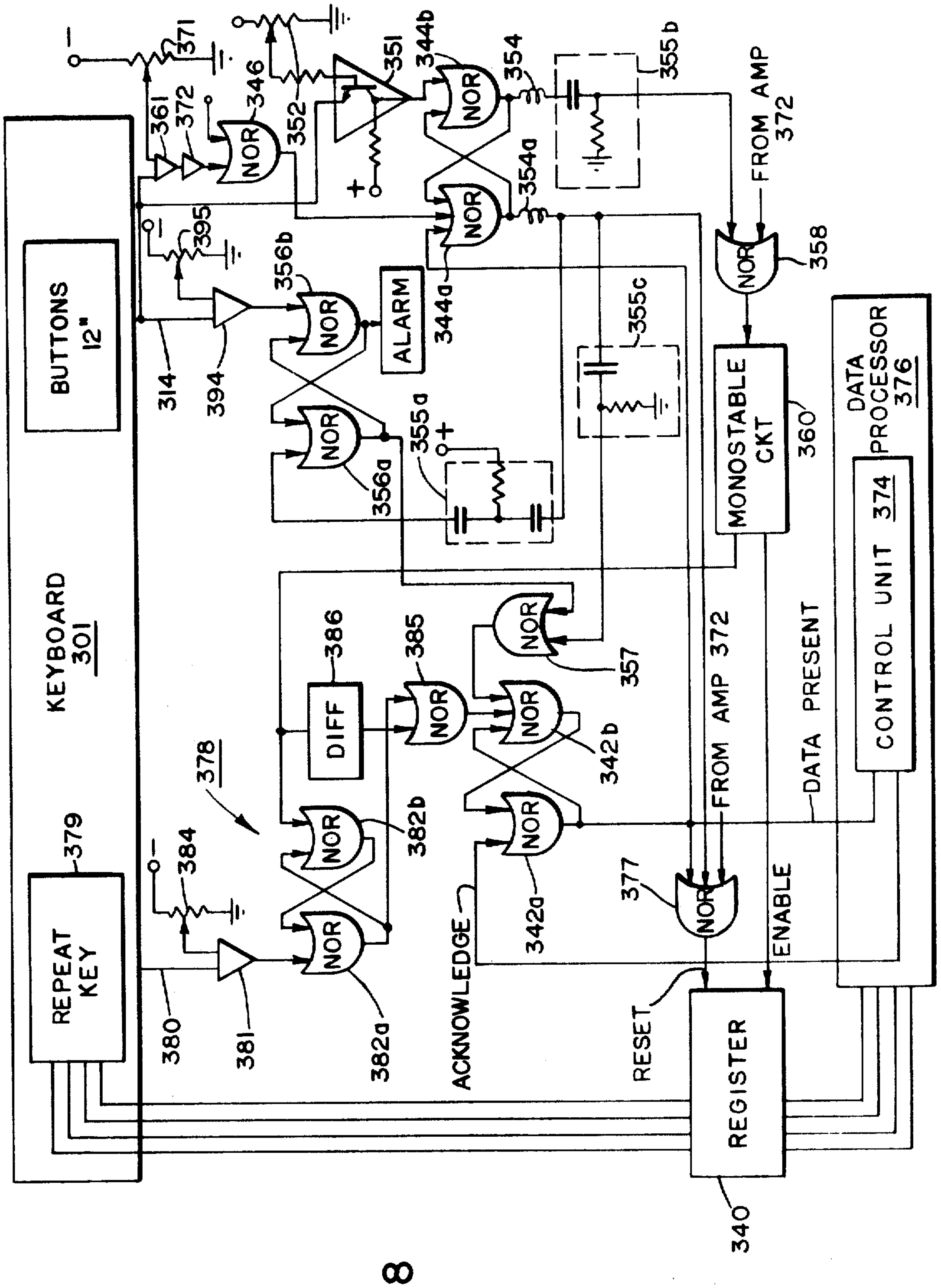
FIG. 18 is a schematic diagram of a system incorporating the keyboard of FIG. 15.
Figure 19:
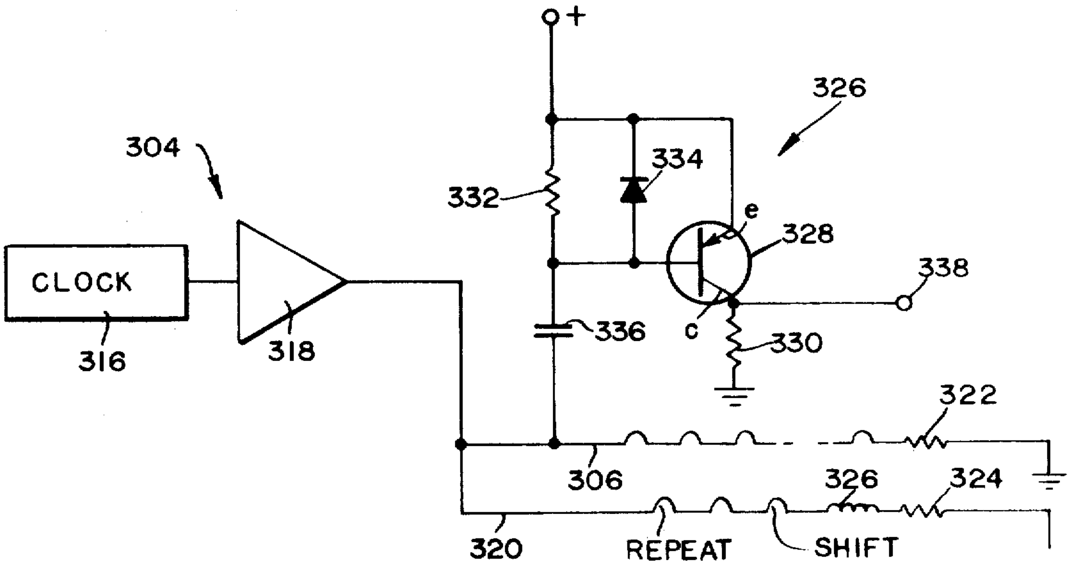
FIG. 19 is a schematic diagram of an input pulse circuit which can be used with the system of FIG. 18.
Figure 20A:
Figure 20B:
Figure 20C:
Figure 21:
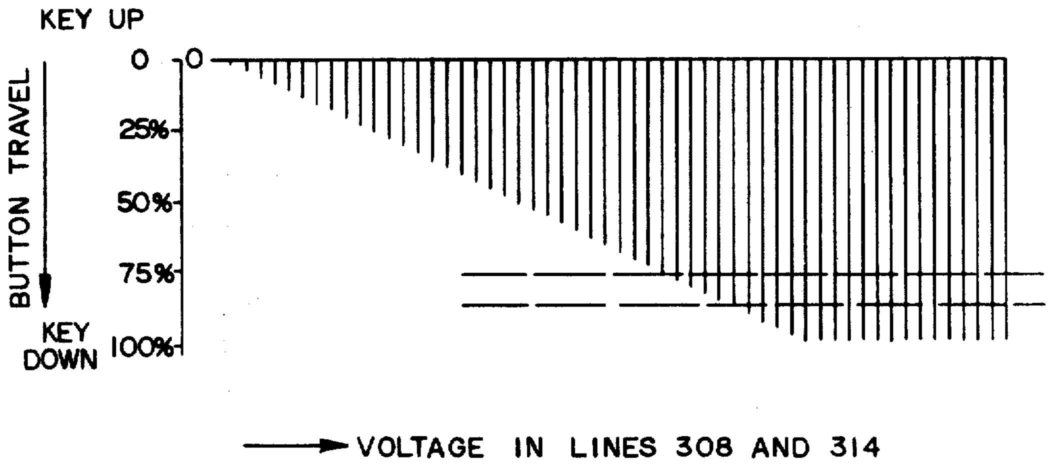
Figure 22:
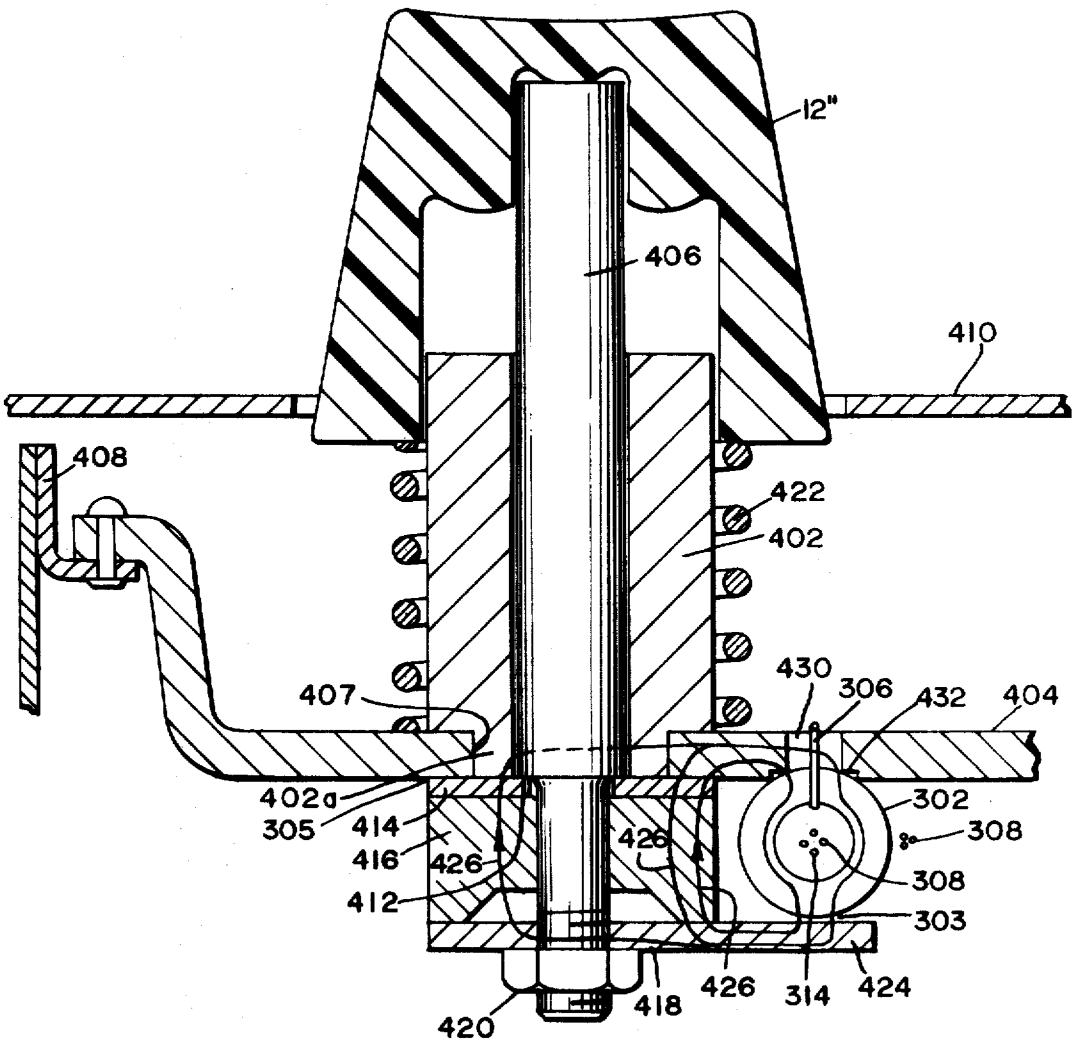
Figure 23:
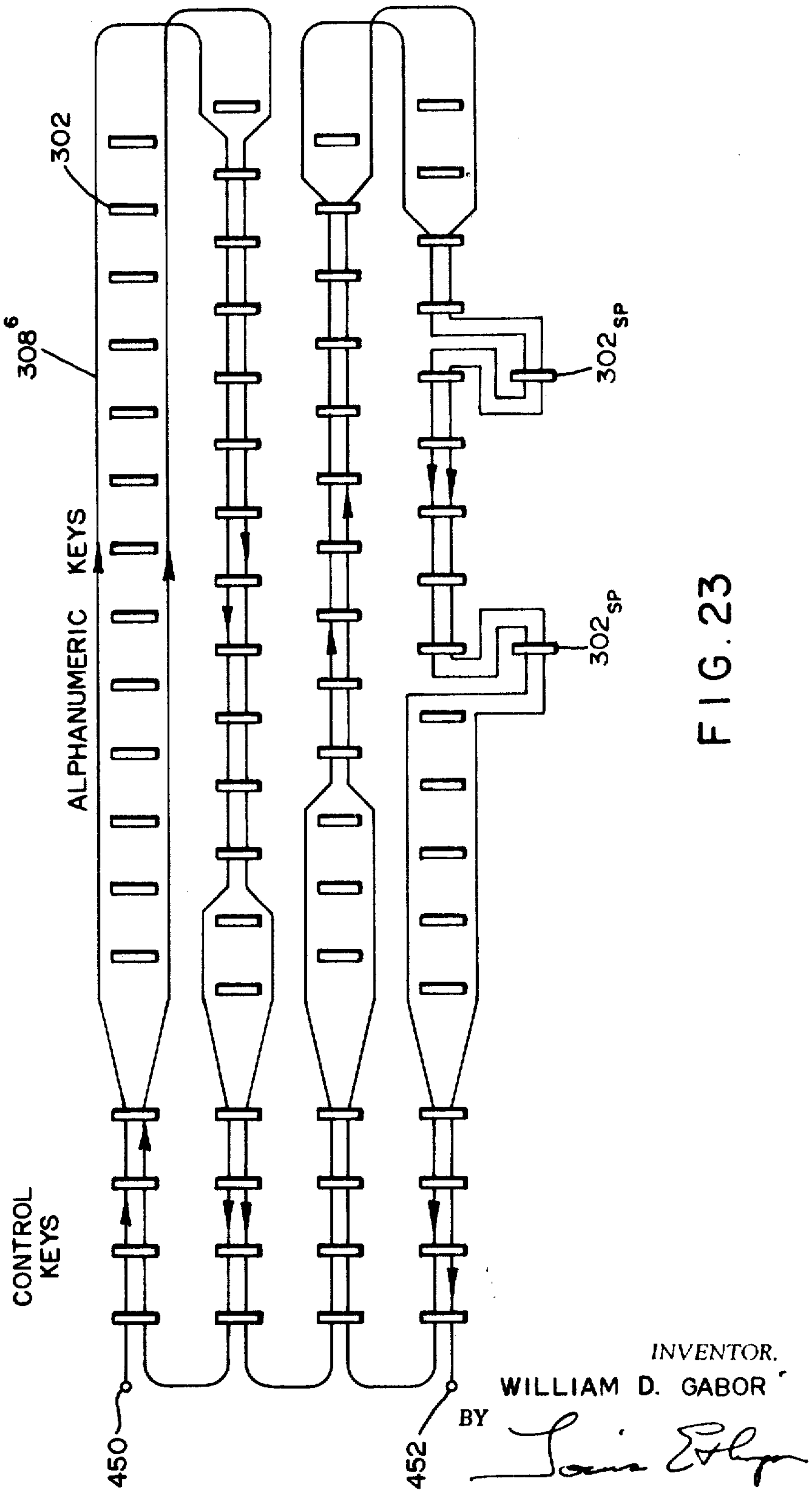

FIGS. 20A, 20B, and 20C, illustrate waveforms associated with the circuits of FIGS. 18 and 19;

FIG. 21 illustrates the variation of the output signal of the keyboard of FIG. 15 as a function of the degree of actuation of a button thereon;

FIG. 22 is a fragmentary cross section of the keyboard of FIG. 15, illustrating the preferred mechanical details associated with one of the keyboard buttons; and FIG. 23 illustrates the preferred manner of providing multiple turn secondary windings in the sensors of FIG. 15.

In general, each character key or button of the present keyboard encoder is operatively associated with one or more sensors which sense movement of the button when it is depressed. The number of sensors associated with each button depends on the coded representation of the character corresponding to the button. Specifically, with a binary code, there may be a sensor for each ONE in the code number for the character and an absence of a sensor for each ZERO.

The encoder also has a digital converter for each digit position in the code number. The converters are connected to the keyboard sensors according to the code. That is, with the above arrangement of sensors, each converter is connected to one sensor associated with every character whose code number has a ONE in the digit position corresponding to the converter.

Each converter provides an electrical output signal corresponding to a ONE whenever a sensor connected to it senses the depression of a button. At all other times the converter's output signal corresponds to a ZERO.

Thus, whenever a button is depressed, the sensors associated with it cause the outputs of the converters connected to them to register ONE signals. The other converters have ZERO output signals. This combination of ONE's and ZERO's is the code number of the character corresponding to the depressed button.

The sensors associated with the keyboard buttons are circuit elements whose transfer function, i.e. ratio of output signal to input signal, is variable.

In the preferred embodiment of the invention, these circuit elements are saturable transformers. Beneath each keyboard button is a transformer having a secondary or output winding for every ONE or ZERO in the binary button representing the character associated with the button. The button carries a magnet and in the normal position of the button the magnet saturates the core of the transformer, thereby preventing any appreciable signal transfer from a driver or input winding to the output windings of the transformer. When the button is depressed, the magnetic circuit of the magnet is altered so as to unsaturate the transformer core and, as a result, a substantial voltage is induced in each of the output windings by the current in the input winding.

The sensor output windings corresponding to each digit position in the output of the encoder are connected in a series string, so that substantially the entire voltage induced in any one of the series connected windings appears across the terminals of the string. Because of the very substantial ratio of permeability of the transformer cores between their saturated and unsaturated condition, e.g. greater than 1,000, there is a great difference between the output voltage across one of these strings when a corresponding button is depressed and when no button has been depressed. This voltage difference is easily detected, thereby providing essentially error-free operation.

As described below in greater detail, the preferred embodiment of the invention also facilitates the prevention of errors due to simultaneous depression of two or more buttons by the keyboard operator. This type of error can be much more serious than the actuation of a single wrong button, since the combined code numbers of two or more buttons on the keyboard may correspond to a code number causing the data processing equipment connected to the keyboard to perform an operation entirely different from that desired by the operator. For example, the data processing equipment might delete information of shift to another mode of operation in response to the false signal resulting from actuation of two alphabetical buttons at the same time.

In another embodiment of the invention, there is a completely separate transformer beneath each keyboard button for every ONE in the binary number representing the character associated with the button. The transformers for each digit position in the output of the encoder are connected in cascade between an oscillator and an amplitude detector. Thus, depression of a keyboard button greatly attenuates the inputs of the detectors deriving their inputs from the signal paths including the transformers saturated by the button. The outputs of these detectors thus register the ONE's in the corresponding binary code number.

In a further embodiment of the invention the circuit elements are variable capacitors. One plate of each capacitor is on the button and the other plate is on a support board below the keys. By means of a unique arrangement, all connections to the capacitors are made to the plates on the support board; there are no electrical connections to the movable buttons. Accordingly, substantially all the wiring involving the sensors can be accomplished by economical printed circuit techniques on the fixed support board; there are no movable contacts and there are no moving connector wires.

The preferred converters for use with the variable capacitor sensors are oscillators in which the sensors serve as elements in the tuned circuits. When a key is depressed, the impedance changes in the sensors associated therewith cause the oscillators connected to the sensors to cease oscillation. Thus, oscillation and nonoscillation of the oscillators correspond to binary ZERO's and ONE's in the postulated arrangement.

As will be seen, the invention makes for a highly compact, reliable assembly free of the problems attendant on switch contacts and moving wires. At the same time, the preferred keyboard has the highly desirable "feel" of a conventional typewriter keyboard. Also, since each converter can be connected with a large number of sensors, this arrangement results in a minimal space requirement and a low overall cost for the converters.

Figure 1:
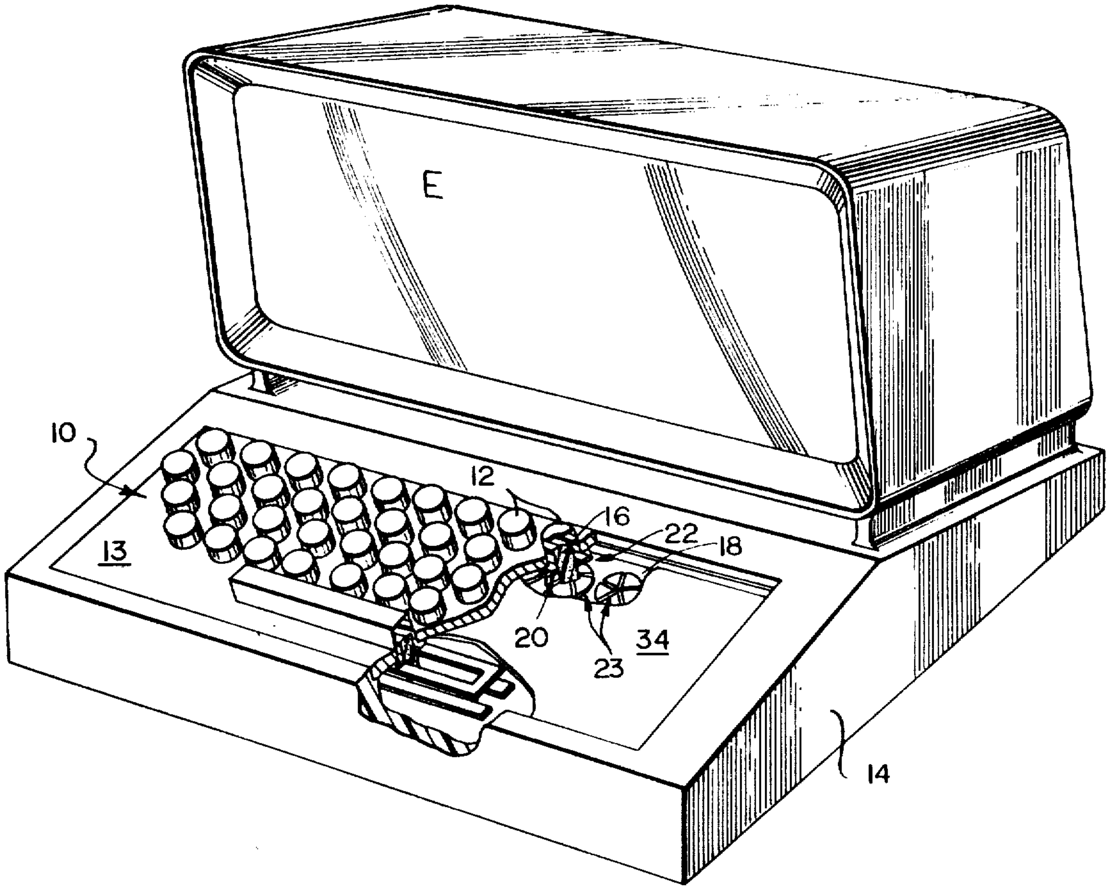
FIG. 1 is a pictorial representation, partly broken away, of an electronic display unit incorporating a keyboard encoder embodying the invention.

In FIG. 1, the keyboard encoder is illustrated in a display device that displays selected keyboard characters on the screen of a cathode-ray tube. The display device can be connected with data processing equipment that stores the messages composed on the keyboard.

Figure 3:
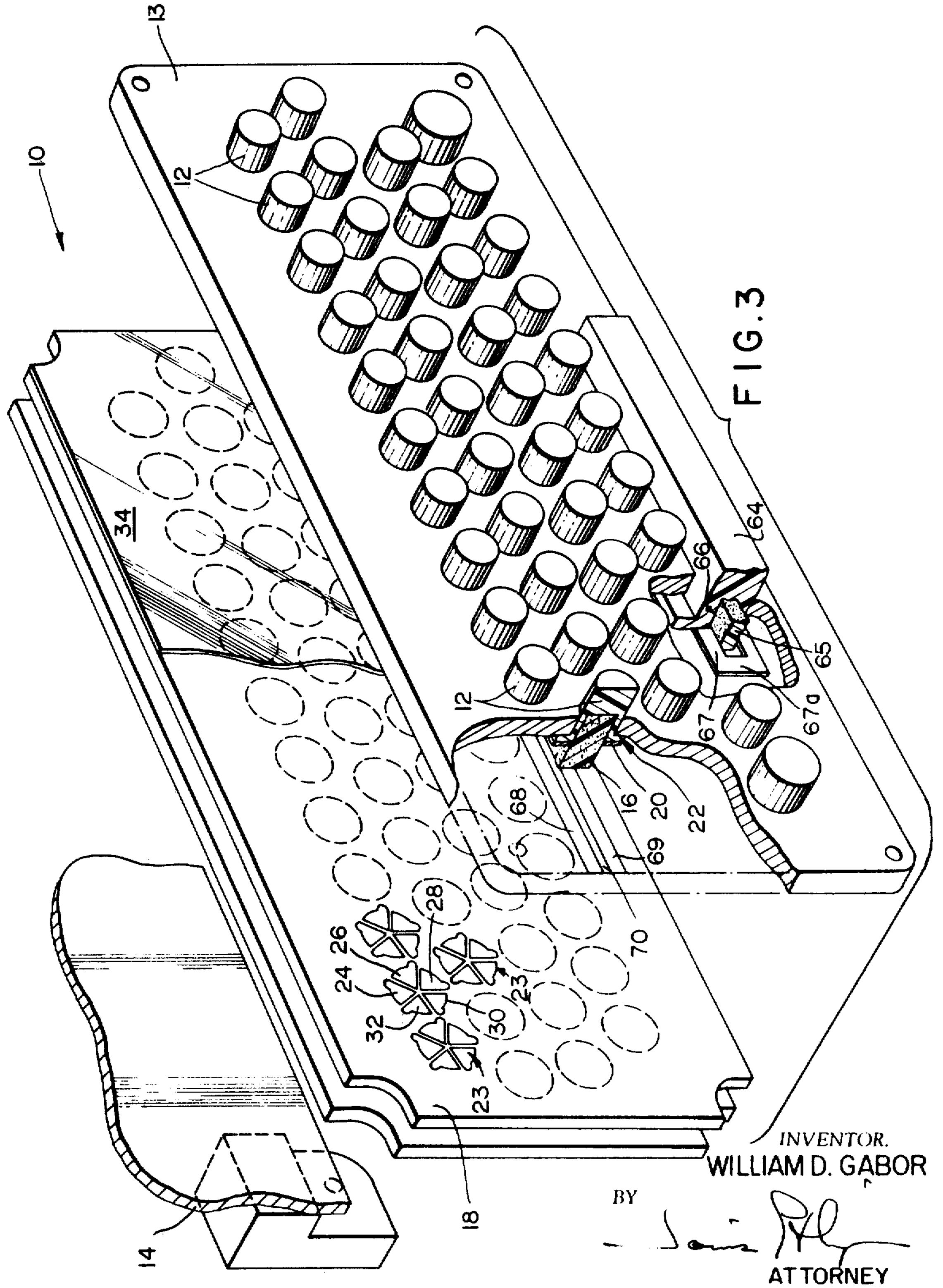
FIG. 3 is an exploded view of the keyboard of FIG. 1.

As shown in FIGS. 1 and 3, the keyboard 10 of the encoder has a plurality of buttons 12 supported in a panel 13 secured to a frame 14. A cushion 16 resiliently urges each button outwardly away from a dielectric board 18 mounted in the frame. An annular electrical coupling conductor 20 is carried on the inner face 22 of each button. A pattern 23 of fixed capacitor plates 24, 26, 28, 30 and 32 is mounted on the dielectric board 18 below each button, and a thin insulating sheet 34 covers the capacitor plates.

The plates 24—32 cooperate with the coupling conductors 20 as sensors detecting depression of the buttons 12 associated therewith. Specifically, there is relatively little capacitance between the several fixed plates 24—32 in each pattern when the associated button is in its normal, undepressed position. However, when a button is depressed to select a character, the capacitances between the plates of the associated pattern are increased substantially by the proximity of the annular conductor 20 carried by the button. The encoder responds to these relatively large interplate capacitances to produce a set of binary signals identifying the selected character.

When reference is made in the following discussion to a particular button 12, to a particular coupling conductor 20, or to fixed plates 24—32 associated with a particular button, the reference numeral for these elements is followed by the character assigned to the particular button. Thus, the coupling conductor 20E is on the button 12E used to select the character E.

The converter 40 produces the rightmost digit, i.e. the digit in the ($2^0$) position, of the encoder output signal and the converters 42 and 44, respectively, produce the digits in the ($2^1$) and in the ($2^2$) positions of the encoder output signal. (The converters for the ($2^3$) and the ($2^4$) position digits, required when letters other than A—G are selected, are now shown.) Thus, whenever a button identifying a character having a ONE in the ($2^0$) digit position is depressed, the converter 40 will produce a signal corresponding to a binary ONE. Otherwise, its output signal corresponds to a binary ZERO.

With this code, to develop the digital signals for the character A, the converter 40 develops a binary ONE signal, and the converters 42 and 44 develop binary ZERO signals. The binary ONES in the code are produced by the sensors associated with the respective buttons 12. Thus, at each button the number of sensors required to provide digit signals is equal to the number of ONES in the code for the character associated with the button. The encoder illustrated in FIG. 2, however, has a uniform number of sensors, i.e. five capacitor plates, at each button and thus has more than the required number of sensors at every button except the one that is identified by a character whose coded representation is five ONES, i.e. 11111. Also, each sensor required at every button is associated with a digit position at which there is a ONE in the binary number identifying the character assigned to that button. Accordingly, the converter 40 is connected to one sensor, i.e. to one fixed plate, at each button having a ONE in the ($2^0$) digit position of its character-identifying number. The converter 42 is connected to a fixed plate at each button having a ONE in the ($2^1$) digit position of the binary number associated with it. The converter 44 is likewise connected to one fixed plate at each button assigned a character number having a ONE in the ($2^2$) digit position. For example, one fixed plate (shown as plate 24A) in the pattern 23A associated with the button 12A is connected to the converter 40 and the remaining plates (i.e. plates 26A—32A), not needed to generate an electrical output corresponding to 00001, are connected to ground.

Similarly, at the button 12B, the fixed plate 24B is connected to an input terminal of the converter 42 and the remaining fixed plates 26B—32B are grounded.

The fixed plate 24C is connected to another input terminal of the converter 40 and the fixed plate 26C is connected to a separate input terminal of the converter 42; the remaining fixed plates 28C, 30C and the 32C are grounded. The fixed plates associated with the buttons 12D, 12E, 12F and 12G are connected to the converters 40, 42 and 44 in the same manner, as shown in FIG. 2.

When the button 12E is depressed, the capacitances between the fixed plates 24E—32E increase from their normal small values to substantially larger values by virtue of the close proximity of the coupling conductor 20E. In response to the larger capacity between the plate 24E and the remaining plates 26E—32E, the converter 40 (connected to the plate 24E) changes its output signal from a value corresponding to a binary ZERO to a value corresponding to a binary ONE. Similarly, the converter 44 connected to the plate 26E changes its output signal to the value corresponding to a binary ONE. The converter 42, on the other hand, is not connected to any of the fixed plates associated with the depressed button 12E. Hence, its output signal remains at the binary ZERO value. The three rightmost digits of the encoder output signal then are 101, which is the desired binary number for the character E. The detailed circuits and operation of the converters 40, 42 and 44 are described below with reference to FIG. 7.

Figure 2:
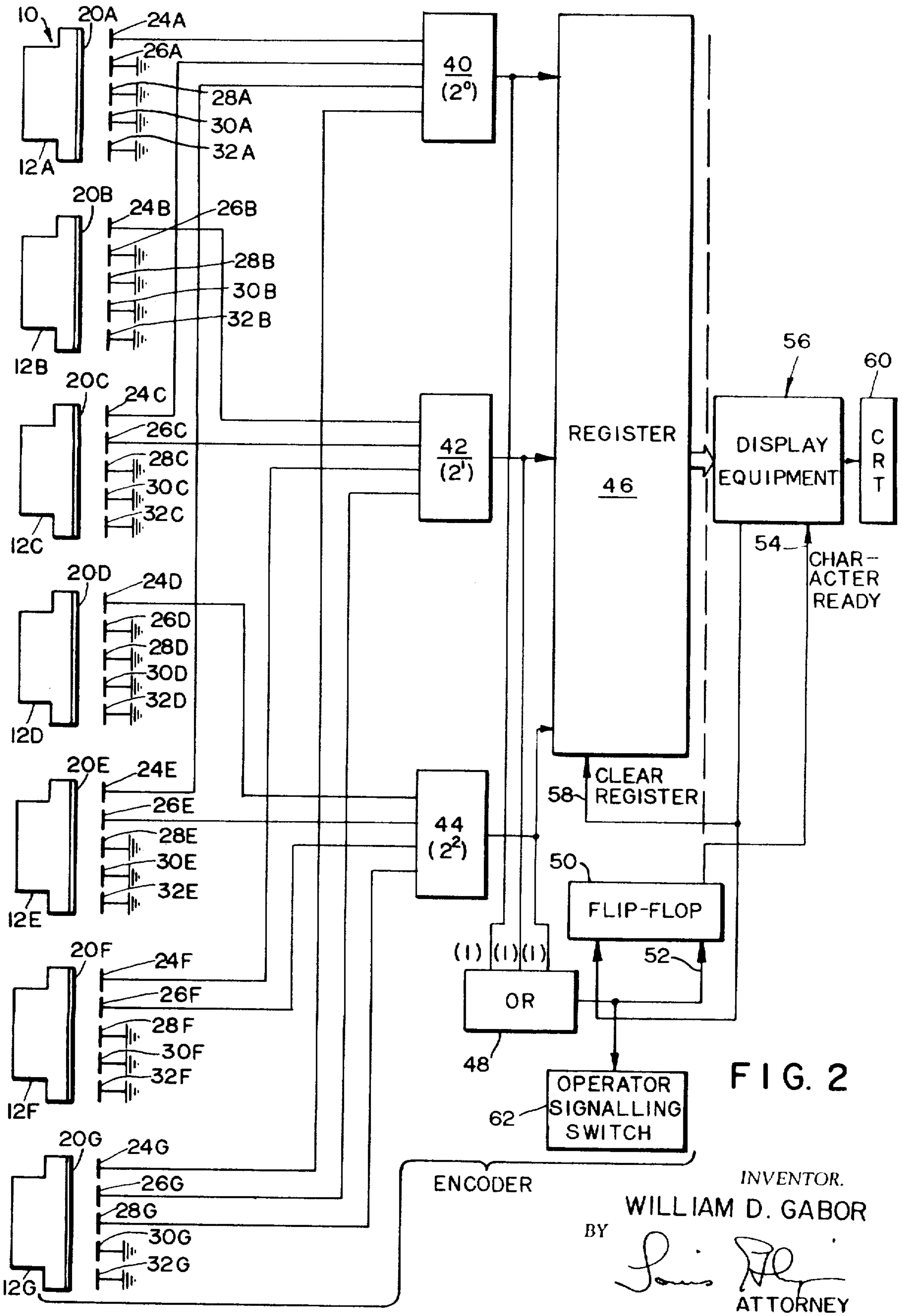
FIG. 2 is a schematic representation of a keyboard encoder embodying the invention and employing variable capacitors to sense actuation of the various keyboard buttons.

As also shown in FIG. 2, the output signals from the converters 40, 42 and 44 are applied to a register 46 and to an OR circuit 48. The register stores the binary signals from the converters 40, 42 and 44.

In response to a binary ONE signal from one or more of the converters, the OR circuit 48 produces a pulse that is applied to the ONE input terminal 52 of a flip-flop 50. The resultant output from the flip-flop 52 is applied to a character-ready terminal 54 on display equipment 56. The flip-flop output thus signals the display equipment that a new character has been selected on the keyboard and is ready to be displayed on the screen of the cathode-ray tube 60. In response to the flip-flop signal, the display equipment 56 processes the digital number in the register 46.

For example, the display equipment can decode the number contained in the register 46 and energize a cathode-ray tube to display the character E on its screen, producing a display of the type shown in FIG. 1. The display equipment clears the register 46 with a signal applied to a clear register input terminal 58. The flip-flop 50 also receives the clear signal, which resets it.

It should be understood that the display equipment 56 and the cathode-ray tube 60 are merely illustrative of data processing equipment that can be operated with the present encoder.

With further reference to FIG. 2, the pulse from the OR circuit 48 is also applied to an operator signalling switch 62. In response to this signal, the switch 62 informs the keyboard operator, with a perceptible output indication such as a click sound similar to that produced by a conventional typewriter, that the converters 40, 42 and 44 have applied a character-identifying signal to the register 46. The perceptible signal provides feedback from the encoder to the operator.

It will now be seen that with up to five fixed capacitor plates 24—32 associated with each button, the encoder can provide $2^6$ or 64 different binary signals and hence identify 64 different characters. These characters, of course, can include alphabetical, numerical and other types of symbols, as well as such typewriter operations as "back-space," and "carriage return." The characters can also identify more specialized instructions for controlling the display or other equipment with which the encoder is operating.

Figure 4:
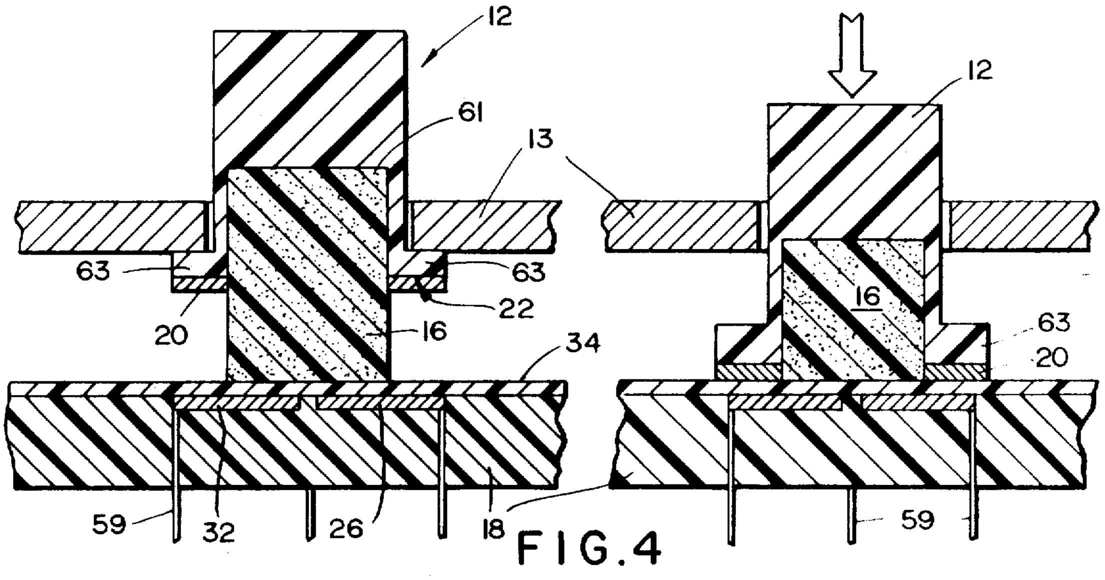
FIG. 4 is a fragmentary side elevation view, partly in section, of the keyboard of FIGS. 1 and 3.

Turning now to FIG. 4, in the keyboard 10 shown in FIGS. 1 and 3, the encoder frame 14 holds the panel 13 at a fixed distance from and parallel to the dielectric board 18. Each cushion 16, preferably a solid right cylinder of resilient plastic foam and seated in a recess 61 in the inner face 22 of the button 12, resiliently urges the button away from the dielectric board 18. A flange 63 at the inner end of each button engages the inner surface of the panel 13 when the button is in this normal, undepressed, position.

The five fixed plates 24—32 associated with each button are formed on the dielectric board 18 with printed circuit techniques and the connection to each plate is made with a lead 59 passing through the board as shown in FIG. 4. The plates can be embedded in the board 18 as shown or they can be formed on the upper surface of the board. The insulating sheet 34 covering the fixed plates preferably has a dielectric constant substantially greater than that of air; a plastic such as poly (ethylene terephthalate), commercially available under the trademark Mylar, is suitable. The sheet can, alternatively, be on the button 12, covering the lower surface of the coupling conductor 20.

As will now be described with reference to FIG. 7, the converters 40, 42 and 44 change their output signals from the ZERO level to the ONE level in response to the larger capacitance thus produced when a button bottoms against the insulating sheet 34. The converter 40 is a double-tuned oscillator having a resonant circuit 102, a resonant circuit 104 and a transistor 106 that operates as an amplifier. The capacitances between the keyboard fixed plates 24—32, shown on the right side of FIG. 7, form part of the resonant circuit 104.

A detector 108 connected to the resonant circuit 102 develops the converter output voltage. When the circuit is oscillating, the detector develops a nonzero direct voltage that corresponds to a binary ZERO. When, on the other hand, a button on the keyboard is depressed, the increased capacitance between the associated fixed plates causes the circuit to cease oscillating and the detector output voltage drops to zero, corresponding to the binary number ONE.

More specifically, the resonant circuit 102 comprises a capacitor 110 having one plate connected to ground. The other plate of the capacitor 110 is connected to one end of an inductor 112. A coupling inductor 114 is connected between ground and the other end of inductor 112. A resistor 116 connects the junction of the capacitor 110 and inductor 112 to the base 118 of a transistor 120.

The input terminal of the detector 108 is also connected to the junction of the capacitor 110 and inductor 112. The output terminal 108a of the detector is the converter output terminal and, as described above with reference to FIG. 2, is connected to an input terminal of the register 46.

The emitter 122 of the transistor 120 is connected to the base of a transistor 126. The transistor collectors 128 and 130 are together connected to the positive terminal of a direct current supply (whose positive terminal is grounded) through a resistor 132 in series with an inductor 134 having a relatively high impedance at the frequency at which the circuit oscillates. Capacitors 136 and 138 are connected to have relatively small impedances at the frequency of oscillation and thus they cooperate with the inductor 134 in decoupling the collectors 128 and 130 from the power supply at this frequency.

The emitter 139 of the transistor 126 is connected to the negative terminal of another power supply (whose positive terminal is grounded) through the series combination of a resistor 140, a resistor 142 and an inductor 144. A decoupling capacitor 146 cooperates with the inductor 144 in decoupling the latter power supply from the junction of the inductor 144 and the resistor 142.

The transistors 120 and 126 form a two-stage emitter follower circuit that presents a relatively high impedance to the resonant circuit 102, that is, the transistors 120 and 126 develop a relatively high impedance between the base 118 of transistor 120 and ground. This makes it possible for the resonant circuit 102 to have a relatively high quality factor. The output of the transistor 126 is applied to a voltage divider comprising resistors 140 and 142; from the junction of these resistors it is fed to the base 150 of the transistor 106 by way of a capacitor 148 in a gain control circuit 155.

A resistor 152 is connected between the emitter 154 of transistor 106 and ground, and the transistor collector 156 is connected to one end of the primary winding 158 of a transformer 160. A bypass capacitor 162 grounds the other end of the primary winding 158 at the frequency of oscillation. A resistor 164 is connected from the positive power supply terminal to the junction of the capacitor 162 and winding 158 to apply operating voltage to the collector 156.

The gain control circuit 155 includes a diode 147 and a resistor 149 connected in parallel with each other between the transistor base 150 and the tap 151 of a variable voltage divider 153. The end terminals of the voltage divider are connected to ground and to the positive power supply terminal.

The secondary winding 166 of the transformer 160 is connected at one end to the junction of the inductors 112 and 114 in the resonant circuit 102. The other end of the winding 166 is connected to one plate of a trimmer capacitor 168 whose other plate is grounded. The transformer 160 steps up the impedance of the transistor 106 reflected to the secondary winding 166 to provide a high quality factor in the resonant circuit 104.

The resonant circuit 102 thus comprises the capacitor 110 in parallel with the series combination of inductors 112 and 114. In the other resonant circuit 104, the winding 166 is in series with the inductor 114. These two inductive elements resonate with the capacitor 168 and the capacitances associated with keyboard fixed plates connected to the terminal 170 (at the junction of the winding 166 and capacitor 168) in the manner described below. The inductor 114 is thus common to both resonant circuits and thereby serves as a feedback link coupling them together. That is, current in the resonant circuit 104 passes through the inductor 114 and energizes the resonant circuit 102. The coefficient of coupling thus provided between the resonant circuits is preferably equal to or less than the critical value. When no keyboard buttons are depressed, the frequency response of the coupled circuits then has a single, relatively narrow, peak centered at a common resonant frequency of the two resonant circuits.

Figure 7:
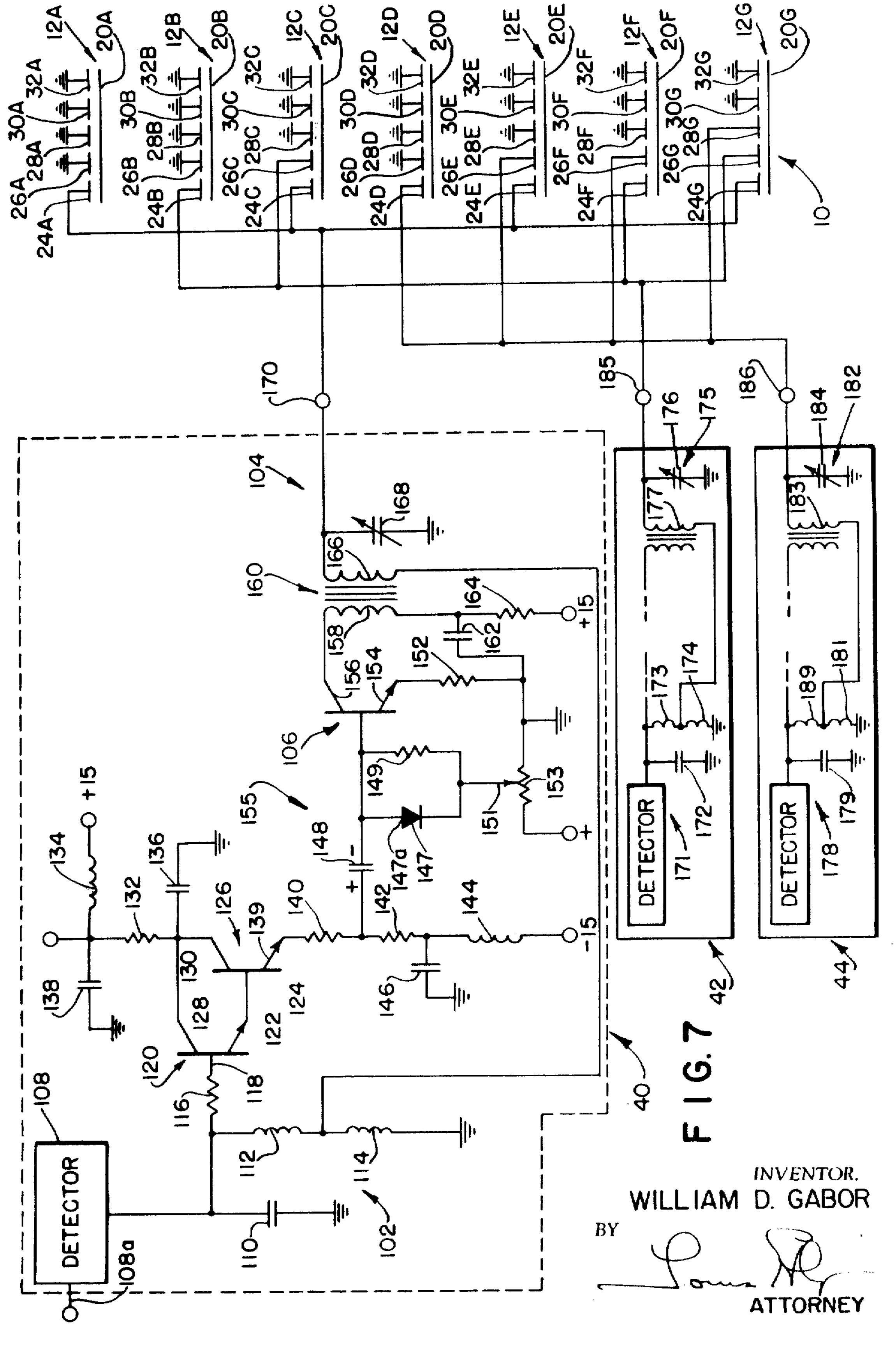
FIG. 7 is a schematic diagram of the arrangement of the converters in the encoder of FIG. 2.

As also shown in FIG. 7, the converter 42, identical to the converter 40, has a resonant circuit 171 formed by a capacitor 172, an inductor 173 and a coupling inductor 174. The other resonant circuit 175 in converter 42 comprises a transformer winding 177, the coupling inductor 174, a trimmer capacitor 176 and capacitances associated with the keyboard fixed plates. Similarly, the converter 44 has a resonant circuit 178 that consists of a capacitor 179, an inductor 180 and a coupling inductor 181. The coupling inductor 181 is also part of a resonant circuit 182 that includes a transformer secondary winding 183, a trimmer capacitor 184 and capacitances formed by fixed plates on the keyboard 10.

With further reference to FIG. 7, in accordance with the logic of the encoder discussed above with reference to FIG. 2, the terminal 170 of the converter 40 is connected to the fixed plates 24A, 24C, 24E and 24G of the keyboard 10.

In the converter 42, the terminal 185 connects to the fixed plates 24B, 26C, 24F and 26G. In the same manner, the converter 44 terminal 186 connects to fixed plates 24D, 26E, 26F and 28G.

The two resonant circuits 102 and 104 of the converter 40 are tuned to resonate at the same frequency, designated *f*(40), when no keyboard buttons associated with the converter are depressed. At this frequency, each tuned circuit 102 and 104 has a high parallel impedance. The resonant frequency of the circuit 104 shifts to a value *f*(40') different from *f*(40) when a keyboard button associated with it is depressed. The frequency *f*(40') is not necessarily the same for all keyboard buttons. The resonant circuits 171 and 175 of converter 42 have a common resonant frequency *f*(42) different from the frequencies *f*(40) and *f*(40'). The resonant frequency *f*(42') of the circuit 175 also differs from these values. Similarly, in the converter 44, the circuits 178 and 182 are resonant at a common frequency *f*(44) different from the frequencies *f*(40), *f*(40'), *f*(42) and *f*(42'). The frequency *f*(44') at which the circuit 182 is resonant when a keyboard button associated with the converter 44 is depressed differs from the other resonant frequencies.

These frequencies are sufficiently separated that in each converter the resonant circuit 104, 175, 182 has a relatively low impedance at the frequencies of the other converters. Thus, at the frequency *f*(40), the fixed plates 24B, 26C, 24F and 26G connected to converter 42 and the fixed plates 24D, 26E, 26F and 28G connected to converter 44 are essentially at ground potential. Hence, each of the plates 24A, 24C, 24E and 24G has a capacitance to ground by way of the associated coupling conductor 20 and other fixed plates. Each of these capacitances is hence in parallel with the trimmer capacitor 168. The combined inductance of the winding 166 and inductor 114 resonates at the resonant frequency of the circuit 104 with the sum of the capacitances.

With further reference to FIG. 7, when none of the keyboard buttons associated with the converter 40 is depressed, the circuits 102 and 104 therein are resonant at the frequency *f*(40) and the converter oscillates at this frequency. The detector 108 rectifies the oscillating voltage across the circuit 102, developing a finite voltage. This output signal from the converter 40, developed when it is in oscillation, is designated as a binary ZERO.

When an operator depresses the keyboard button 12E, for example, the capacity from the plate 24E to the remaining plates 26E—32E increases as described above. The net capacitance to ground at terminal 170 is thus increased and the circuit 104 is no longer resonant at the frequency *f*(40). This change in the resonant frequency of the circuit 104 diminishes the amplitude and shifts the phase of current at the frequency *f*(40) in the circuit 102. As a result, the current applied to the transistor 106 does not have the proper phase or amplitude to sustain oscillation and the converter 40 stops oscillating. The output voltage from the detector then drops to zero, corresponding to a binary ONE.

When the button 12E is released, the circuit 104 again resonates at the frequency *f*(40) and the converter 40 resumes oscillation at this frequency.

If the transistor 106 saturates when the converter 40 is oscillating, more time is required for the converter to stop oscillating after the resonant circuit 104 is detuned than when the transistor is not saturated. Moreover, it is desirable that the transistor 106 have relatively low gain, as measured with the output voltage at the transistor collector 156 relative to the input voltage at the junction of resistors 140 and 142, when the circuit is oscillating as compared to the gain when it is not oscillating. As will now be described, the gain control circuit 155 prevents the transistor 106 from saturating and provides this gain control.

The variable voltage divider 153 is set to place the tap 151 at a direct voltage such that the diode 147 conducts when the voltage between its anode 147*a* and ground increases to a value (V1) just below the minimum base-to-ground voltage that will saturate the transistor 106. This action of the diode 147 limits the instantaneous base-emitter voltage of transistor 106 to a maximum value below the value that saturates the transistor. Further, when the converter is oscillating, rectification and smoothing by the diode 147 and capacitor 148 provide a negative bias voltage (−V2) at the base 150 substantially equal to the amount by which the peak oscillating voltage applied to capacitor 148 exceeds the voltage (V1). The transistor conducts only when the voltage at the base is sufficiently positive to forward bias the base-emitter junction.

Figure 8:
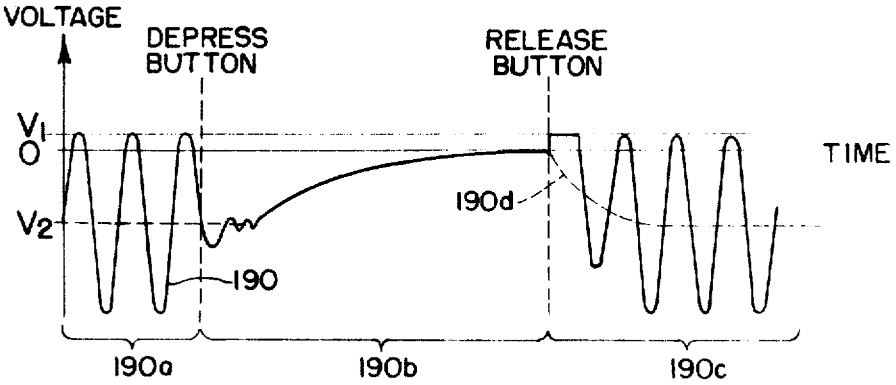
FIG. 8 is a graph depicting the operation of one converter shown in FIG. 7.

This operation of the gain control circuit 155 is illustrated in the graph of FIG. 8, where the waveform 190 represents the voltage to ground at the transistor base 150. In the region 190*a*, the converter is oscillating and the diode 147 conducts to limit the positive excursion of the oscillating voltage to (V1). This biases the transistor base 150 to the level (−V2) and the alternating component of the base voltage oscillates about this level.

When a keyboard button 12 associated with the converter 40 is depressed, the oscillations cease and, as shown in the waveform region 190*b*, the voltage at the base 150 slowly increases as the capacitor 148 discharges through a path including the resistor 149 and the voltage divider 153. When the capacitor 148 has discharged to the point where the base-emitter junction is forward biased, as long as the resonant circuit 104 in the converter 40 is detuned by depression of a keyboard button, the phase of the current which the circuit 104 develops in the resonant circuit 102 is not proper to resume oscillation. Only when the depressed button is released does the converter resume oscillation.

As shown in the waveform region 190*c*, the capacitor 148 then charges again to provide the negative clamping voltage (−V2), as shown at 190*d*. Since charging current flows through the relatively low resistance of the diode 147, the voltage at the base 150 drops more rapidly than it increased during discharge of the capacitor.

The circuit 155 thus prevents the transistor 106 from becoming saturated. Further, the negative level (−V2) to which the transistor base voltage drops, FIG. 8, becomes more negative as the amplitude of the oscillating voltage applied to the transistor base increases. As a result, as the input voltage at the junction of resistors 140 and 142 increases, the output voltage developed at the transistor collector 156 increases at a decreasing rate due to the voltage (V2) becoming increasingly more negative. On the other hand, when the circuit is not oscillating and the voltage (V2) diminishes, the gain between the junction of resistors 140 and 142 and the collector 156 is relatively large. The circuit accordingly rapidly resumes oscillation when a depressed keyboard button is released. The oscillator in the converter can thus be regarded as having an internal feedback loop that maintains the amplitude of the oscillating voltage produced at the transistor collector 156 relatively stable. This operation facilitates adjusting the converters to cease oscillating only when a keyboard button is fully depressed to bottom against the insulating sheet 34 covering the fixed capacitor plates (FIG. 4). The self-stabilizing operation of the converter is also important in preventing changes in the values of the circuit elements, such as caused by aging or changes in the environmental temperature, from producing changes in the frequency and bandwidth of oscillation.

The components of a converter 40, resonating at 850 kilocycles when no associated buttons are depressed, have the nominal values set forth below. These specific values are only illustrative; the invention is not limited to them.

transistors 120, 126 and 106 type 2N918
diode 147 type 1N914
resistors 140 and 142 2.4 K ohms
resistor 132 220 ohms
resistor 149 5.1 K ohms
resistor 152 510 ohms
resistor 164 220 ohms
resistor 116 6.8 K ohms
voltage divider 153 1 K ohm
capacitor 110 adjustable between 30 and 40 micromicrofarads
capacitors 136, 138, 146 and 162 0.1 microfarad
capacitor 148 10 microfarads
capacitor 168 adjustable between 2 and 18 micromicrofarads
inductor 112 1 millihenry (Q of 200)
inductor 114 adjustable between 1.8 and 2.5 microhenrys (adjusted to below critical coupling)
inductors 134 and 144 100 microhenrys
transformer 160 turns ratio of winding 158 to winding 166 is 3:10; winding 166 has an inductance of 1 millihenry and a Q of 200.

It will be apparent that the converters can alternatively be constructed to oscillate only when one or more keyboard buttons associated with them are depressed. Moreover, they can be arranged to change their oscillating conditions in response to changes in inductance instead of capacitance.

For inductance operation, the keyboard is arranged so that depressing a button changes an inductance, rather than a capacitance, in one or more of the converters. More particularly, referring to FIGS. 10 and 11, a high resistance coupling element 192 of a high permeability magnetic material such as a ferrite is bonded to the inner face 22 of each button 12.

Further, the dielectric board 18 carries a layer 194 of high permeability magnetic material. Under each coupling element 192, a pattern of essentially two-dimensional inductors 196, 198, 200, 202 and 204 is embedded in the upper surface of the layer 194. Electrical connections are made to the ends of the inductor by leads passing through the dielectric board 18 and the layer 194; the leads 206—207 and 208—209 are shown in FIG. 10 for the inductors 204 and 198, respectively.

When a button 12 carrying an inductive coupling element 192 is in its normal position, the magnetic coupling between the coupling element 192 and each inductor 196, 198, 200, 202 and 204 below it is relatively small. When the button is depressed, this magnetic coupling increases as the air gap between the coupling element and the inductors decreases. When the button is fully depressed, to engage the coupling element 192 against the layer 194 with essentially no airgap between them, the reluctance in the path of the magnetic field developed by each inductor decreases markedly, and its inductance increases correspondingly. The converters 40, 42 and 44 (FIG. 7) can transform this change in inductance to a binary signal.

Figure 10:
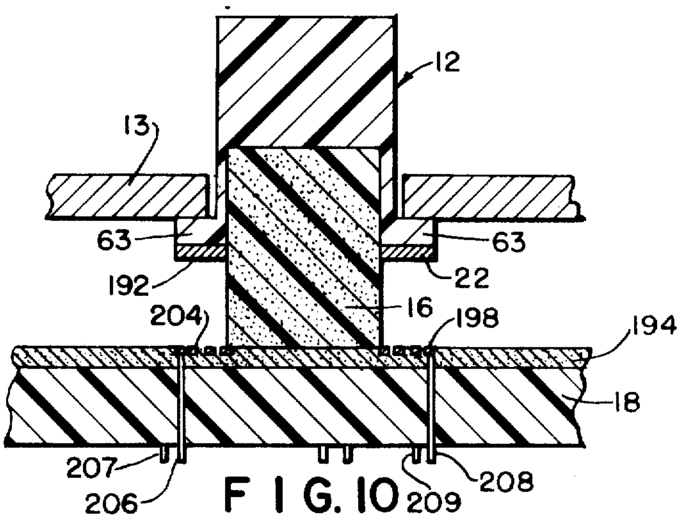
FIGS. 10, 11 and 12 show alternative constructions for the keyboard of FIG. 3.
Figure 11:
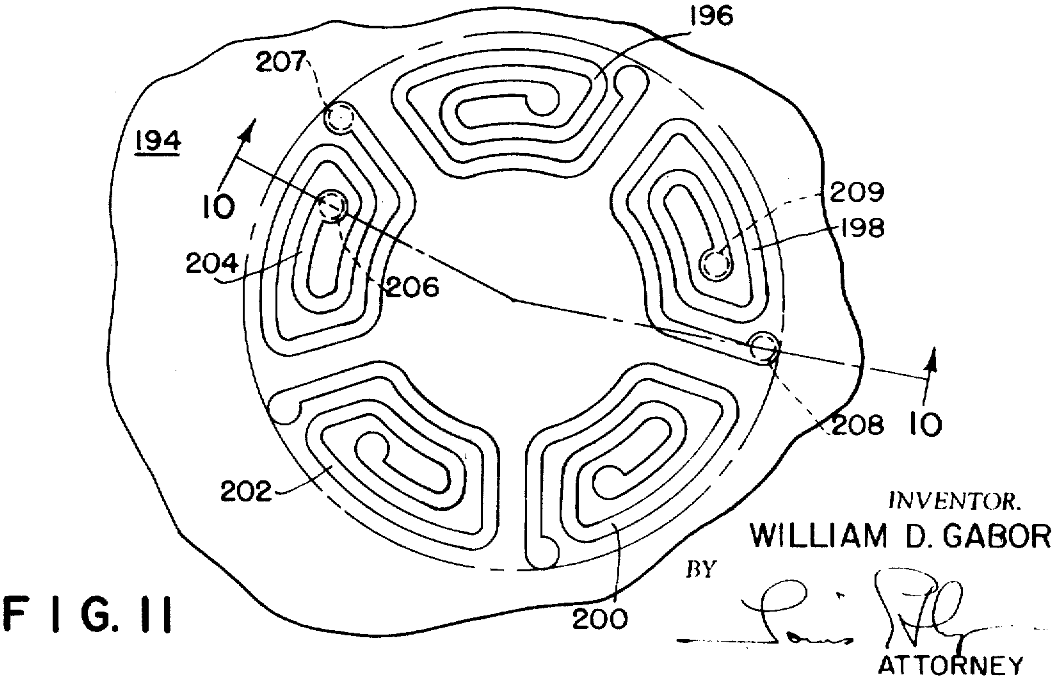

Considering the inductive keyboard button of FIGS. 10 and 11 in greater detail, the inductors 196, 198, 200, 202 and 204 are illustrated with considerable enlargement. In practice, they can be fabricated with photoetching techniques to have a large number of closely spaced narrow threadlike turns.

Each pattern of inductors preferably is arranged in conformity with the annular shape of the magnetic coupling element 192. The purpose of this geometry is to make the coupling element 192 on a depressed button intercept a large portion of the magnetic flux lines produced by each inductor associated with it. This produces a relatively large change in the inductance of each inductor, compared to its initial inductance, when its associated button is depressed.

Although the inductors 196—204 are shown as essentially two-dimensional spirals of ribbon conductor, other winding geometries, including three-dimensional ones, can be employed.

The coupling element 192 can alternatively be of a magnetic material of high nickel-iron alloy such as Permalloy, which has lower resistance than ferrites. In this instance, an insulator is provided between the coupling element and the conductors forming the inductors 196—204 to prevent electrical contact when a button is fully depressed. Further, the annular coupling element is preferably arranged with separate segments thereof covering each inductor; the segments are insulated from each other to prevent currents from circulating around the coupling element.

Figures 9, 12:
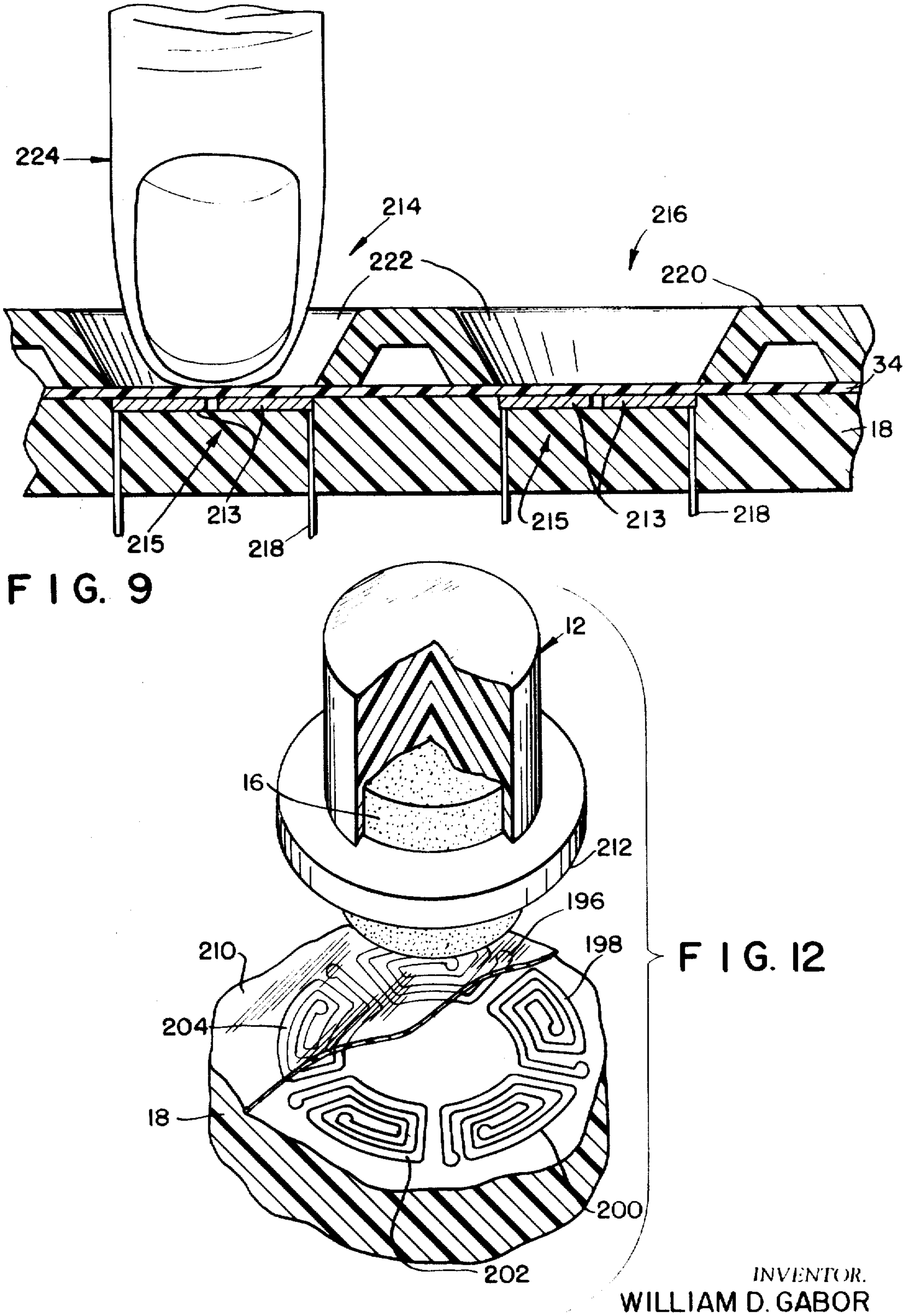
FIG. 9 is a fragmentary sectional side elevation view of a buttonless keyboard embodying the invention.

Turning to FIG. 12, an inductive keyboard for use in an encoder embodying the invention can alternatively employ a button-carried coupling element that operates solely as a "shorted turn," to diminish the inductance of each inductor associated with it when the button is depressed. More particularly, the illustrated construction has the same FIG. 11 pattern of inductors 196, 198, 200, 202 and 204 formed with printed circuit techniques directly on the dielectric board 18, without the FIG. 10 layer 194 of magnetic material. A thin insulating sheet 210 covers the inductors.

The button 12 has a nonmagnetic coupling element 212 of conductive material on its surface facing the inductors; the coupling element 212 thus is of the same type as the FIG. 4 coupling element 20.

When the button 12 carrying the coupling element 212 is depressed, the coupling element intercepts the magnetic field produced by current in each inductor 196—204 below it. According to well-known principles, opposing currents induced in the coupling element set up magnetic fields that oppose the field of each inductor. As a result, the inductance of each inductor decreases.

When the coupling element 212 is of resistive material, so that it does not fully short the inductors, a resistance is reflected across each inductor when the button is depressed. The resultant change in the quality factor of each inductor can be sensed with the FIG. 7 converters to develop the encoder output signal.

Returning to FIG. 3, the keyboard includes an elongated button 64 as commonly used for a spacebar. The spacebar passes through the panel 13, in the same manner as the buttons 12, and is resiliently urged away from the dielectric board 18 by a sponge cushion 65 in the shape of a right parallelepiped. The cushion 65 is seated in a mating recess 66 centrally disposed in the bottom of the spacebar. Flanges on the ner end of the spacebar engage the inner surface of the panel when the spacebar is not depressed. A coupling conductor 67 is secured to the unrecessed portion of the bottom surface of the spacebar, i.e. along the rectangular path around the periphery of the recess 66.

A single pair of elongated fixed capacitor plates 68 and 69 are secured on the dielectric board 18 opposite the coupling conductor 67 and under the insulating sheet 34. Each plate 68 and 69 is substantially coextensive with the coupling conductor and the two elongated plates are spaced apart in the direction transverse to the longitudinal direction of the spacebar 64.

With this arrangement, the spacebar bottoms on the insulating sheet 34 opposite both fixed plates 68 and 69 even when the operator depresses the spacebar at an extreme end so that the coupling conductor 67 is angled with respect to the fixed plates. For example, when only the end 64*a* of the spacebar is depressed, the coupling conductor 67 engages the insulating sheet 34 with a portion 67*a* that bridges across the gap 70 opposite both fixed plates. Consequently, the increase in capacitance between the fixed spacebar plates 68 and 69 when the spacebar is depressed has substantially the same magnitude when the button is pushed down at only one end as when it is pushed down so as to remain parallel to the plane of the fixed plates.

The keyboard also can be constructed with more than two fixed plates associated with the spacebar coupling conductor 67 and still obtain substantially uniform capacitance changes at the several plates when the spacebar button is depressed at only one end. For example, in the embodiment fragmentarily shown in FIG. 5, the coupling conductor 67 is carried on a spacebar identical to the spacebar 64 of FIG. 3. However, on the dielectric board 18, interconnected fixed conductor segments 71*a* and 72*b* form one fixed plate and interconnected fixed conductor segments 72*a* and 72*b* form a second fixed plate. Three additional fixed plates are formed by interconnected conductor segments 73*a* and 73*b*, 74*a* and 74*b*, and 75*a* and 75*b*. The conductor segments 71*a*, 72*a*, 73*a*, 74*a* and 75*a* are disposed beneath one end of the coupling conductor 67, and the other segments are beneath the other end of the coupling conductor. Moreover, the conductor segments are arranged in the same successive order from each end of the coupling conductor so that the segment 71*a* is beneath one extreme end of the coupling conductor and the segment 71*b* is beneath the other extreme end. The conductor segments are oriented parallel to each other and each segment extends between opposite longitudinal edges of the coupling conductor, as shown.

Figures 5, 6:
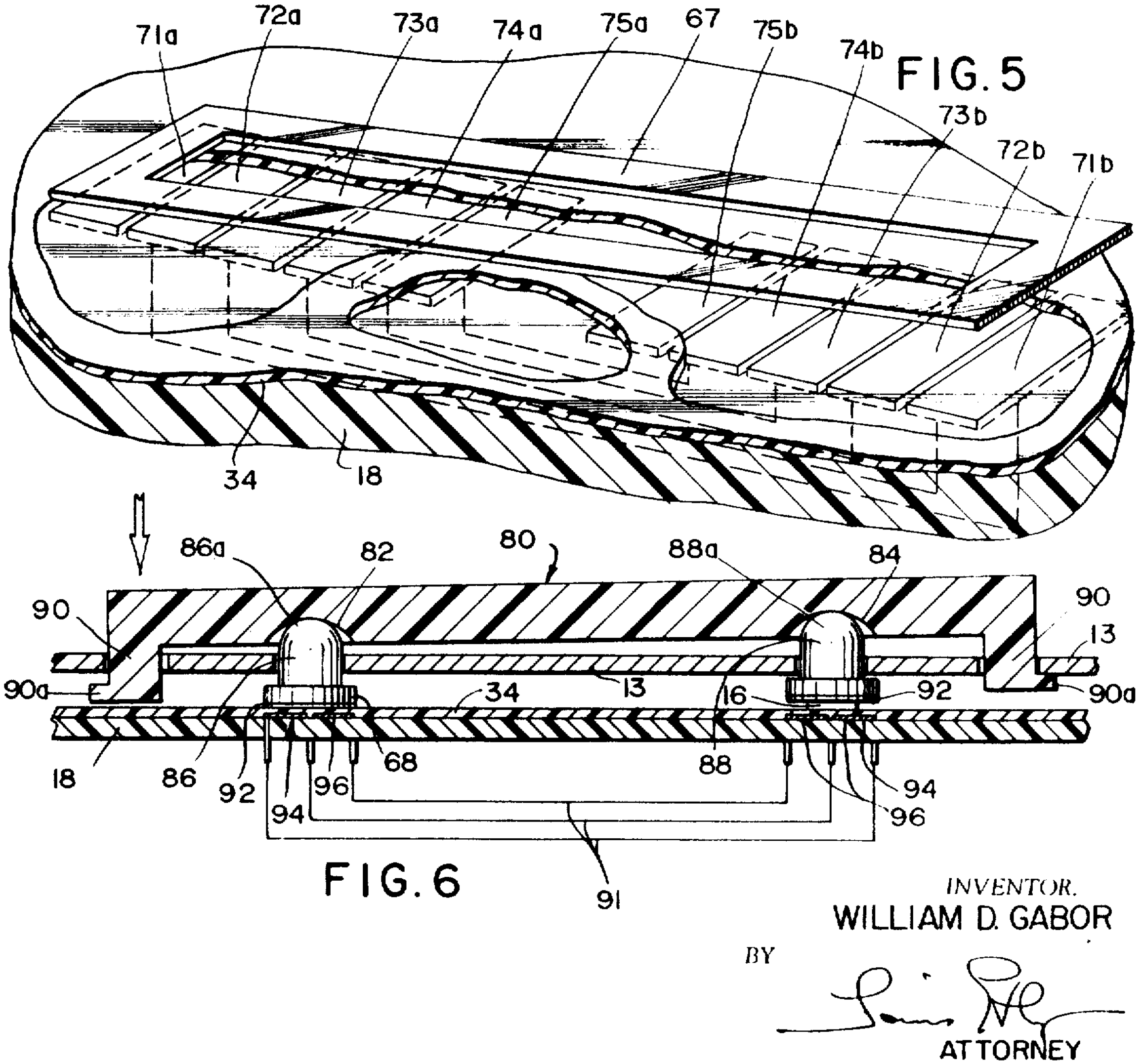
FIGS. 5 and 6 show different constructions for a space button for a keyboard embodying the invention.

When the spacebar is depressed so that the coupling conductor 67 is canted with respect to the plane of the conductor segments as shown in FIG. 5, the corresponding conductor segments 71*a* and 71*b* have respectively the largest and the smallest capacitance to the coupling conductor. The conductor segments 72*a*, 73*a*, 74*a* and 75*a* have successively decreasing capacitances to the coupling conductor, whereas at the other end of the spacebar button the segments 72*b*, 73*b*, 74*b* and 75*b* have successively increasing capacitances to the conductor 67. The total capacitive coupling from each two corresponding segments 71*a*—*b*, 72*a*—*b*, 73*a*—*b*, 74*a*—*b* and 75*a*—*b* hence has roughly the same value as the coupling of the other corresponding segments for any position of the spacebar. This uniformity of capacitance values, regardless of the manner in which the spacebar is depressed, facilitates the use of a relatively simple network of converters, such as the ones shown in FIG. 7.

FIG. 6 shows an alternative construction for a spacebar key which proves a uniform capacitance from each of a pair of sensors when the spacebar is depressed by pushing down only at one end. In this arrangement, a spacebar 80 does not carry a coupling conductor. Instead, adjacent each end of the spacebar are rounded sockets 82 and 84 that accommodate plungers 86 and 88 respectively. The plungers 86 and 88, of insulating material, can be identical to the buttons 12 described above except that they have rounded heads 86*a* and 88*a* that seat in the sockets 82 and 84. As with the FIG. 3 buttons 12, a cushion urges each of the plungers 86 and 88 away from the dielectric board 18.

The spacebar 80 is held in place above the panel 13 by means of an integral tab 90 depending from each end and passing through the panel 13 and a flange 90*a* extending outwardly from each tab.

Each plunger 86 and 88 has on its bottom surface a coupling conductor 92 that can be identical to the coupling conductor 20 used on the buttons 12 as shown in FIGS. 3 and 4. A pattern 94 of fixed plates 96, identical to the FIG. 3 pattern 23 of fixed plates, is disposed beneath each coupling conductor 20, between the insulating sheet 34 and the dielectric board 18. As also indicated in FIG. 6, each plate 96 associated with plunger 86 is connected, as by a lead 91, to one plate 96 associated with the plunger 88.

When only the end of the spacebar 80 adjacent plunger 86 is depressed so that the spacebar becomes angled with respect to the plane of the patterns 23 of fixed plates, the coupling conductor 92 on the plunger 86 nevertheless bottoms flat against the insulating sheet 34. The coupling conductor 92 on the plunger 86 is hence uniformly spaced from each fixed palate below it, with no intervening air gap. The capacitance from each plate 96 associated with plunger 86 to every other plate in the same pattern therefore has the same relatively high value. The same result obtains if only the other end of the spacebar 80 is depressed or if both ends are depressed. The net capacitance associated with each of the interconnected plates 96–96 therefore has the same value as the capacitances of the other interconnected plates 96–96.

Turning now to FIG. 9 (which is a cross-sectional view similar to the view shown in FIG. 4), an encoder embodying the present invention can also be constructed without movable buttons. Instead, placing the operator's finger on a character-designating location on the keyboard changes the capacitance between fixed plates sufficiently to produce a character-identifying signal. The FIG. 9 keyboard has fixed capacitor plates 213 arranged in patterns 215, much as the FIG. 3 plates 24—32 are in patterns 23, for each character-designating location, two of which are shown at 214 and 216. The plates 213 are supported on the dielectric board 18 and covered with the insulating sheet 34. Leads 59 connect each plate to decoders in the same manner as shown in FIG. 7 for the keyboard 10.

A panel 220 of insulating material is mounted on the laminate formed by the board 18 and sheet 34. The panel is formed, as by molding, with a through hole 222 at each character-designating location.

As illustrated for the location 214, to "type" a character, the operator places his finger, indicated fragmentarily at 224, in the hole 222 against the insulating sheet 34. Due to the electrical conductivity of human flesh, the finger thus intimately disposed above the plates 213 increases the capacitance between the plates in essentially the same manner as the button-carried coupling conductor 20 of FIG. 3.

Figures 13, 14:
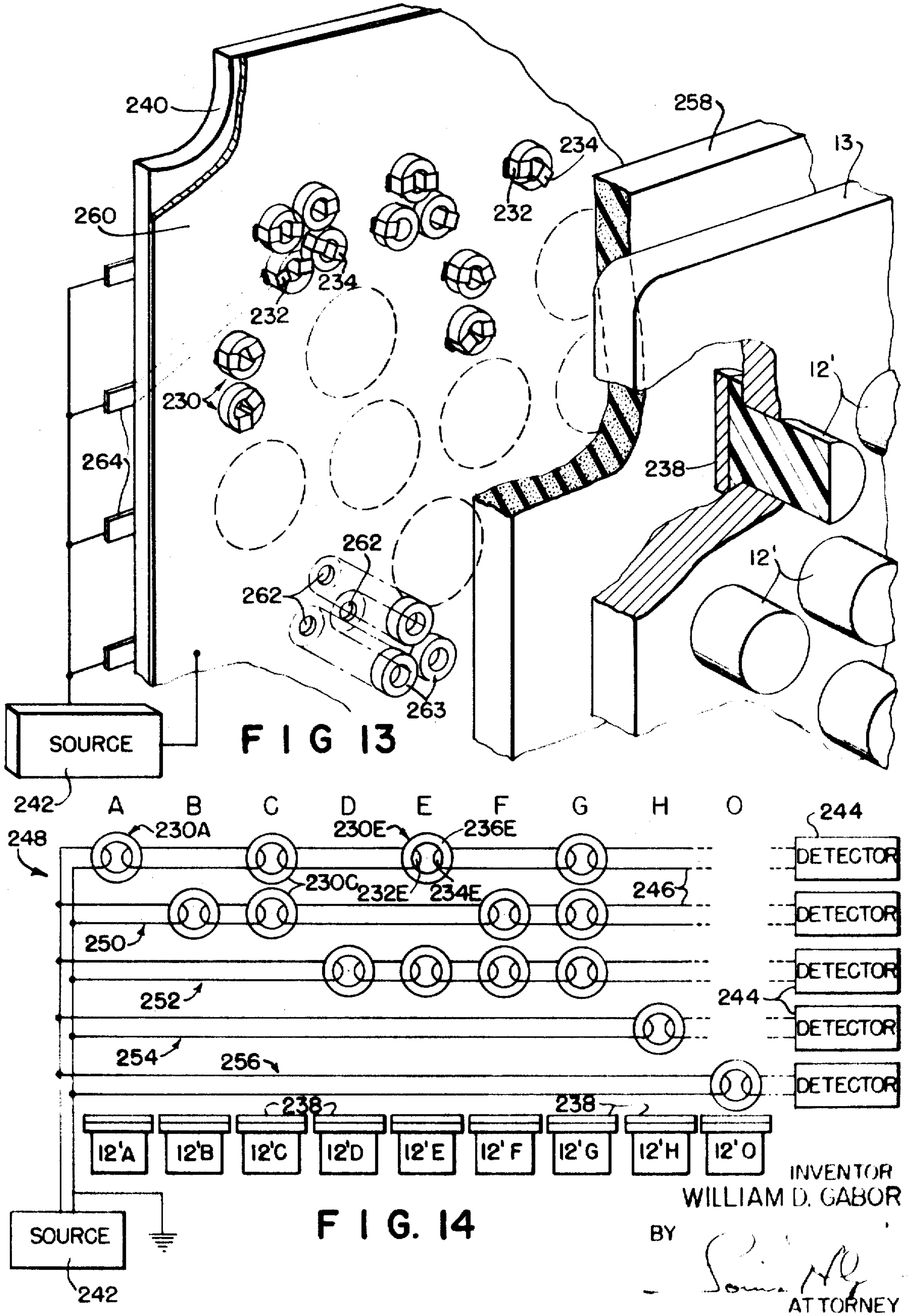
FIGS. 13 and 14 show another keyboard encoder employing saturable transformers to sense actuation of the keyboard buttons.

FIGS. 13 and 14 show an embodiment of the keyboard encoder where each sensor comprises a transformer 230 having a toroidal core 236 threaded with a single-turn primary winding 232 and a single-turn secondary winding 234. The sensor also has a permanent magnet 238 carried on the inner end of the button 12′ with which the transformer 230 is associated. Where a button has several sensors associated with it, a single permanent magnet 238 can be arranged to cooperate with each of the transformers 230, as shown in the drawings.

The transformer cores 236 are mounted on a support board 240 opposite the associated permanent magnets 238. The number of transformers 230 associated with each button 12′ is equal to at least the number of binary ONES in the character-identifying number assigned to the button. As in the other keyboard encoders described above, each transformer is associated with a ONE in the binary number identifying its associated button.

As shown in the schematic view of FIG. 14, a source 242 is connected to the primary winding 232 of one transformer 230 associated with each digit position. Further, one other transformer associated with each digit position has its secondary winding 234 connected to a detector 244. The remaining windings on the transformers associated with each digit position are interconnected by connecting the secondary winding on one transformer with the primary winding of another transformer associated with the same digit position. In this manner, the transformers associated with the same digit position are cascaded in a chain between the source 242 and one detector 244. The links of each chain are the cores 236 alternated with conductor loops 246 formed by the interconnected secondary and primary windings. There is thus a chain 248 associated with the ($2^0$) digit position of the five-digit binary character-identifying numbers assigned to the buttons, and a chain 250 associated with the ($2^1$) digit position in these numbers. Also, chains 252, 254 and 256 are respectively associated with the ($2^2$), ($2^3$) and ($2^4$) digit positions in these binary numbers.

With further reference to FIG. 14, consider the button 12'C assigned to the character C. It is assigned the five-digit number 00011 to identify this character. This binary number has a ONE in the ($2^0$) position and in the ($2^1$) position. Therefore, two cores 236 are associated with the button 12'C, one core being in the chain 248 associated with the ($2^0$) digit position and the other core being in the chain 250 associated with the ($2^1$) position.

When the button 12'C is not depressed, the permanent magnet 238 carried on it is well-spaced from the two cores 236C and the transformers 230C thus have relatively high couplings, i.e. relatively low attenuation, between their primary and secondary windings. Each chain 248—256 then has a relatively low-loss amplitude transfer function and accordingly applies a relatively large signal from the source 242 to its detector 244. Each detector then develops an output signal corresponding to a binary ZERO.

When the button 12'C is depressed, the permanent magnet 238C on its inner end moves closer to each of the two cores 236C and its magnetic field saturates them. Each saturated core couples relatively little signal from its primary winding 232 to its secondary winding 234. Thus, the amplitude transfer functions of chains 248 and 250 decrease by relatively large amounts, illustratively corresponding to a 30 db. increase in attenuation. The signals these two chains apply to their detectors 244 hence decrease materially.

In response to the resultant low-level signals from the chains 248 and 250, the detectors 244 connected with them develop output signals having a value corresponding to a binary ONE. The detectors 244 connected to the chains 252, 254 and 256, on the other hand, continue to receive relatively large signals from the source 242 and hence produce ZERO signals. The resultant set of binary signals from the five detectors 244 thus corresponds to the number 00011 assigned to the button 12'C.

As shown in FIG. 13, at each button 12', all the cores 236 associated therewith are substantially symmetrically disposed with respect to the permanent magnet 238 on the button, so that the reluctance of each core changes by a substantially uniform amount when the associated button is depressed. This uniformity in the coupling between the cores 236 and their associated permanent magnets 238 standardizes the output signals from the chains 248—256, thereby facilitating converting them to binary signals with the detectors 244.

The buttons 12' that carry the permanent magnets 238 are preferably identical to those used in the keyboard of FIG. 3 and are similarly mounted in a panel 13. However, the illustrated buttons 12' do not have recesses 61 for cylindrical cushions 16 as shown in FIG. 14. Instead of these individual cushions 16, the keyboard encoder shown in FIG. 13 has a layer 258 of resilient insulating sponge material covering the entire array of cores 236 and engaging, on its other side, the permanent magnets 238 to resiliently urge the buttons 12' into their normal positions. When a button is depressed, the layer 258 under it compresses to a small fraction of its normal thickness, thereby allowing the magnet carried on the button to be moved very close to the associated cores.

For example, an illustrative synthetic sponge material having a normal thickness of around 1.2 centimeters readily compresses to around 0.1 to 0.2 centimeter. With such a small spacing between the permanent magnet on a depressed button and the cores associated with it, the reluctance of each core changes by a substantial amount, as desired to produce a large change in the signal applied to the detectors 244. The resilient layer 250 also electrically insulates the permanent magnets from the transformer windings.

The resilient insulating layer 258 of FIG. 13 can also be used in other embodiments of the keyboard encoder discussed above. For example, in the embodiments of FIG. 12, the insulating layer 210 and the individual sponge cushions 16 can be replaced by a layer of the insulating resilient cushion material disposed between each coupling conductor 212 and the inductors 196—204 opposite it.

The support board 240 in FIG. 13 is preferably a printed circuit board of insulating material having a grounded copper cladding 260 on one side to form a common return path for the conductive loops 246. The illustrated cladding 260 is on the surface facing the keyboard buttons. In this position it helps to shield the circuits and loop-forming conductors on the other side of the board from disturbing electric and magnetic fields.

Holes 262 extend through the cladding 260 and the board 240 at each place where a core 236 is to be mounted. The toroidal cores are mounted on the board concentric with these holes by bonding them to the copper cladding with an adhesive.

When the support board is thus copper clad in one side, each conductive loop 246 can be formed with a ribbonlike copper band 264 bonded to the other side of the board 240. The connection from each end of the band through a hole 258 in the support board and the copper cladding, and continuing around the core mounted over the hole to the copper cladding 260, is preferably made with printed circuit or dip soldering techniques, although hand wiring can also be used. Where the cores are of a relatively low resistance material, they should be insulated prior to being mounted on the copper cladding, or otherwise insulated from the conductors forming the conductive loops 246. Thus, each conductive loop 246 consists of a band 264 on one side of the support board 240, the copper cladding 260 on the other side of the support board, and two connections between the band and the cladding, each connection threading through a core and a hole in the support board.

The cores 236 are preferably of ferrite and have a high relative permeability, illustratively around 2000, when the permanent magnets are in their normal positions. Although the cores are illustrated as being closed toroids, other geometries can be employed.

The source 242 has a low output impedance commensurate with the parallel impedance of the five chains 240—256 connected to it. It preferably has a power amplifier stage to provide sufficient signal level to drive all five chains. The frequency of the source is not critical because the change in attenuation through each chain when an associated button is depressed is substantially the same at any frequency between roughly 20 kilocycles and 2 megacycles.

The encoder of FIGS. 13 and 14 thus requires only a single source and produces a fairly large signal change whenever a character button is depressed. Moreover, in addition to being free of moving contacts, it is free of critical circuits and components. Hence, it is highly reliable and can readily be constructed at a relatively low cost.

It will now be apparent that the inductive sensors described above with reference to FIGS. 10—12 can alternatively be arranged to become saturated when a button carrying a permanent magnet is depressed. Also, the present keyboard encoder can employ sensors that signal the depression of the associated button with a change of phase rather than of amplitude or resonant frequency. For example, transformers as shown in FIGS. 13 and 14 can be arranged to reverse the phase of the signals applied to the detectors by 180° when the transformers become saturated.

The preferred embodiment of the invention is illustrated in FIGS. 15—23. In the simplified schematic illustration of FIG. 15, the buttons 12"A—12"E of a keyboard 301 are arranged to carry magnets 300A—300E which, in the normal positions of the buttons, provide magnetic fields saturating toroidal magnetic cores 302A—302E. Whenever a button is depressed, thereby increasing the gaps 303 and 305 in the magnetic circuit between a magnet 300 and the associated core 302, the reluctance in the magnetic circuit is increased and the magnetic field in the core to provide a substantial mutual inductance for transfer of signals from an input winding to one or more output windings.

More specifically, a pulse generator 304 is connected to apply periodic pulses to input windings connected in a series string. Preferably each winding passes through its core only once, i.e. it has a single turn, with each series string having the form of a single conductor or drive line 306 threaded through all of the cores 302A—302E. Output windings in the form of continuous digit lines 308 are threaded through the cores according to the digital code representing the characters corresponding to the buttons 12". Thus, the digit line $308^0$, corresponding to the $2^0$ position in the output code, passes through the cores 300A, 300C and 300E; the line $308^1$, corresponding to the $2^1$ digit position, passes through the cores 300B and 300C; and the line $308^2$, corresponding to the $2^2$ digit position, passes through the cores 300D and 300E.

With none of the buttons 12" depressed, the permeability of each of the cores 302A—302E is approximately that of air and accordingly there is little magnetic coupling between the drive line 306 on the one hand and the digit lines 308—312 on the other hand. The current pulses on the drive line therefore induce relatively small voltages in the digit lines.

If the button 12"C, for example, is fully depressed, the core 302C, upon attaining its unsaturated condition, will undergo increase in permeability of as much as a thousandfold. There will be a significant increase in the mutual inductance between the drive line 306 and the digit lines $308^1$, $308^2$ passing through this core. Pulses of substantial voltage will thus be induced in these digit lines in response to the current pulses in the drive line. For example, the voltage pulses may have a magnitude of the order of 4 volts. On the other hand, the total voltage induced in the digit line $308^0$, which does not pass through the core 300C, remains at a negligible level, e.g. 0.5 volt (including noise), even though the line may pass through as many as forty saturated cores. This combination of signals on the lines 308 is an electrical representation of the code number 011 corresponding to the letter C associated with the button 12"C.

Actuation of any of the other buttons 12" similarly provides a substantial voltage on one or more of the digit lines 308 according to the code number corresponding to the actuated button. Since the voltages induced in the digit lines passing through the selected cores are so much greater than the signals in the lines passing around the cores, it is a relatively simple matter to determine which digit lines correspond to a selected keyboard button and which do not. The ability to distinguish between the lines is enhanced by the fact that the signal level on the lines passing through the selected cores is much greater than interfering signals produced in these lines by stray fields from other sources. Accordingly, simple, inexpensive circuits can be used to register the code numbers representing the selected characters with an essentially complex absence of error.

It will be apparent that the arrangement of FIG. 15 is readily extended to all the buttons of a keyboard such as the one illustrated in FIG. 1 by including a separate digit line for each digit position in the output code number and in general threading the drive line 306 through all the cores as in the simplified illustration. In some cases, it may be desirable to split the keyboard into sectors with separate drive lines in the respective sectors connected to the pulse generator 304 and likewise to have separate groups of digit conductors in the respective sectors. However, I have found that division of the keyboard in this manner is not required with the number of buttons used on conventional keyboards.

Also included in the keyboard of FIG. 15 are sense windings in the form of a sense line 314 passing through all of the cores 302 associated character-identifying buttons 12". The line 314 provides a signal whenever any of the buttons 12" is depressed, this signal being used in the control circuit described below. Also, should two or more buttons be simultaneously depressed, the voltage induced in the line 314 will be correspondingly greater than the signal resulting from the actuation of a single button, since the windings in which the voltages are induced are in series in the sense line. Detection of the additional signal can be used to indicate the actuation of two or more buttons so that the operator can take corrective action. Additionally, this indication can be used to prevent processing equipment connected to the keyboard from responding to the false signal emanating from the keyboard.

FIG. 21 illustrates the variation of the voltage induced in the sense line 314 or any of the selected data lines 308 as a function of the position of an actuated button 12" in the keyboard of FIG. 15. As the button is depressed, the voltage pulses induced in these lines increase almost linearly in magnitude with displacement of the button. There are two levels that are of interest in connection with the following discussion. The first of these is a sense threshold level which, by way of example, may be set at about 85 percent of maximum output voltage. The second level, which may be termed the termination threshold level, is somewhat smaller in magnitude than the sense threshold level, e.g. about 75 percent of maximum output voltage.

As shown in FIG. 18, the data lines from the keyboard 301 of FIG. 15 are connected to a register 340 which temporarily records the signals on the data lines and thus contains the digital number corresponding to the particular button 12" depressed by the keyboard operator. The register 340 includes a suitable gating arrangement activated by an enable signal to accept the signals from the keyboard. The manner in which the enable signal is derived will now be described in detail.

As shown in FIG. 19, the pulse generator 304 comprises a clock 316 which emits pulses to an amplifier 318. The output of the amplifier 318 in turn is applied to the main drive line 306 passing through all the cores associated with characters encoded by the keyboard encoder. The pulses from the amplifier 318 are also applied to an auxiliary drive line 320 threaded through cores associated with certain keys which do not correspond to encoded characters. For example, one of these may be a repeat button whose actuation provides repetition of the character corresponding to another actuated button. Another of these may be a shift key.

The drive lines 306 and 320 may be terminated with small (e.g. one ohm) resistors 322 and 324 as shown to facilitate monitoring of the current waveforms in these lines. Also, an inductor 326 may be connected in series with the line 320 so that this line, which passes through substantially fewer cores than the line 306, has an impedance commensurate with that of the latter line and thus does not draw an inordinate proportion of the current supplied by the amplifier 318.

With further reference to FIG. 19, a pulse generator 326, whose input is provided by the amplifier 318 is arranged to deliver output pulses that are narrower and somewhat delayed with respect to the pulses emitted by the generator 304. The generator 326 includes a transistor 328 connected in a common emitter circuit with its emitter 328*e* connected to a positive power supply terminal ad its collector 328*c* connected to a load resistor 330. A resistor 332 and a diode 334 are connected as shown between the base 328*b* and the emitter 328*e* of the transistor. A coupling capacitor 336 is connected between the output terminal of the amplifier 318 and the base 328*b*.

The capacitor 336 and resistor 332 form a differentiating network so that the signal at the base 328*b* comprises positive and negative pulses corresponding to the leading and trailing edges of the pulses from the amplifier 318 (FIG. 20A). The transistor 328 is normally cut off and therefore the positive-going pulses at the base 328*b* do not affect its conduction. The negative-going pulses, on the other hand, are of sufficient amplitude to turn the transistor on and preferably bring it to saturation, thereby applying essentially the full power supply voltage to the output terminal 338 connected to the collector 328*c*. The resultant waveform at the terminal 338 is illustrated in FIG. 20B. The diode 334 prevents the positive pulses of the differentiated waveform at the base of transistor 328 from damaging the transistor.

Illustratively, the frequency of the clock 312 may be of the order of 10,000 to 20,000 Hz. with a pulse width of 0.4 microseconds at the output of the amplifier 318. Generally, it will be desirable to have somewhat narrower pulses, e.g. 0.2 to 0.8 microseconds, in the output of the pulse generator 326.

The various inverters and coincidence circuits in FIG. 18 operate at two discrete voltage levels in accordance with conventional binary digital circuit techniques. For the purpose of illustration, we shall assume that these two levels are zero and a positive potential, e.g. 4.5 volts, although, of course, any pair of voltage levels may be used. Each illustrated coincidence circuit is a NOR circuit, i.e. an OR circuit followed by an inverter. Specifically, each one is an OR circuit for the zero voltage level so that if any one or more inputs of an OR circuit is at the ground level, the output of the NOR circuit will be at the positive level; if all of the inputs are at the positive level, the output will be at the ground level. Other logic elements might of course be substituted for those specifically mentioned herein.

As shown in FIG. 18, a pair of NOR circuits 342*a* and 342*b* are interconnected to form a flip-flop 342. Similarly, a flip-flop 344 comprises NOR circuits 344*a* and 344*b*. Initially, the state of the flip-flop 342 is such that the output of the NOR circuit 342*b* is at the zero level and the output of the NOR circuit 342*a*, which provides one of the inputs for the NOR circuit 342*a*, is at the positive level. The output of a NOR circuit 346, which is also connected to the NOR circuit 342*a*, is at the positive level, thereby permitting the flip-flop 344 to have an initial zero level output from the NOR circuit 344*a* and a positive output from the NOR circuit 344*b*.

The sense line 314 is connected to one input terminal of an amplifier 351 whose output is applied to the NOR circuit 344*b*. The amplifier has a second input terminal connected to the tap of a potentiometer 352 to which a fixed voltage is applied. The amplifier is connected in a threshold arrangement by which it is cut off until the voltage on the line 314 exceeds a level determined by the setting of the potentiometer tap. Above this level the amplifier provides an output sufficient to trigger the flip-flop 344.

For example, the sense line 314 may be connected so that the pulses therein have a negative polarity in the circuit of FIG. 18 and a negative voltage may be applied to the potentiometer 352. The line 314 is connected to the emitter of a transistor connected as a common base amplifier; the transistor base is returned to ground by way of the potentiometer tap. With the transistor normally cut off a positive voltage will normally be applied by the amplifier 351 to the NOR circuit 344*b*. Whenever a keyboard button 12'' (FIG. 15) is depressed and the pulses induced in the sense line increase in magnitude as illustrated in FIG. 21, the transistor remains cut off until the pulses overcome the bias provided by the potentiometer 352. At slightly beyond this point the transistor saturates and the voltage applied to the NOR circuit 344*b* goes to the zero level. The potentiometer is set so that this occurs at the sense threshold level.

This causes a change in the state of the flip-flop 344, with the output of the NOR circuit 344*a* shifting to the zero level. This voltage step at the output of the NOR circuit 344*a* is changed to a relatively short ground level pulse by a differentiator 355*a*. The pulse resets an error flip-flop 356, whose NOR circuit 356*a* thereupon provides a positive input for a NOR circuit 357. Small inductances 354*a* and 354*b* in series with the loads imposed on the flip-flop 344 decrease loading of the NOR circuits 344*a* and 344*b* to ensure that the flip-flop 344 switches its state after it has been triggered.

At the same time the change in level at the output of the NOR circuit 344*b* is converted to a positive pulse by the differentiator 355*b*. This pulse is applied to a NOR circuit 358, which emits a corresponding ground level pulse to trigger a monostable circuit 360. The output from the monostable circuit 360, during the interval in which it is in its unstable state, enables the gates in the register 340 to accept the signals on the data lines 308. The unstable state lasts for slightly longer than the clock pulse period, to ensure that pulses on the data lines reach the register during this interval. Therefore, the register 340 now contains the digital representation of the character corresponding to the particular button 12'' selected by the keyboard operator.

In the meantime, the signals on the sense line 314 are also coupled to an amplifier 361 connected in a threshold arrangement with a potentiometer 371 connected to a negative voltage source. In this case the threshold level is the termination level (FIG. 21). Since the termination level is reached before the sense level whenever a button 12'' on the keyboard 301 is depressed, the amplifier 361 will provide a series of pulses prior to actuation of the flip-flop 344. These ground level pulses are passed through an amplifier 372 whose output is applied to the NOR circuit 346.

At the same time, positive pulses from the pulse generator 326 (FIG. 19) are also applied to the NOR circuit 346. As seen in FIGS. 20B and 20C, the pulses from these two sources coincide in time. Accordingly, so long as the output of the amplifier 370 persists, there is a ground level at one of the two corresponding input terminals of the NOR circuit 346, thereby maintaining the positive level at the output of the inverter.

As the depressed button 12'' in the keyboard 301 is released for upward travel, the pulses on the sense line 314 correspondingly decrease in magnitude. When they reach the termination threshold level, the pulses from the amplifier 361 cease, with the amplifier 372 then maintaining the positive voltage level at its output. The NOR circuit 346 thus emits ground level pulses corresponding to the positive pulses from the pulse generator 326. The application of these pulses to the NOR circuit 344*a* returns the flip-flop 344 to its original state.

A differentiator 355*c* converts the resulting change in the output voltage of the NOR circuit 344*a* to a positive pulse; and with both inputs of the NOR circuit 357 now positive, this NOR circuit applied a corresponding ground level pulse to the NOR circuit 344*b* to set the flip-flop 342. The resulting output voltage level of the NOR circuit 342*a* serves as a data present signal to a control unit 374 associated with a data processor 376 receiving the information generated on the keyboard 301. The control unit 364 causes the data processor to record the contents of the register 340.

After the data processor 376 has recorded the contents of the register 340, the control unit 364 emits an acknowledge signal to the NOR circuit 342*a*, thereby returning the flip-flop 342 to its initial state.

The chance of emitting an erroneous signal is materially reduced by the hysteresis effect involving the shifting of the flip-flop 344. A relatively large sense level on the sense line 314 is required to shift it in one direction and a significantly smaller termination level must then be attained before the flip-flop can be returned to its initial state by the NOR circuit 346. The hysteresis prevents unwanted recycling of the flip-flop 344 due to slight jitter of a keyboard button which has been depressed or even due to small voltage variations in the circuit. If the flip-flop were to recycle in this manner, it could cause unwanted repetitive loading of the same keyboard character into the data processor 366.

The hysteresis effect is enhanced by the application of signals from the amplifier 372 to the NOR circuit 358. Specifically, as the signal on the sense line 314 increases in magnitude during the actuation of a keyboard button 12", it may cause a small perturbation in the output of the NOR circuit 344*b* even though it has not reached the sense threshold level required for shifting of the flip-flop 344. This perturbation takes the form of small pulses corresponding to the sense line pulses and these are amplified by the NOR circuit 358 to the point where they might cause premature loading of the register 340. If this occurs at signal levels no greater, or only slightly greater than, the termination level, there will be only a negligible hysteresis effect.

The pulses from the amplifier 372 inhibit the NOR circuit 358, i.e. force a positive output from it and since they occur at the same time as the low level pulses passed by the NOR circuit 344*b*, they prevent the latter pulses from triggering the monostable circuit 360. On the other hand, the changes in output level of the NOR circuit 344*b* accompanying the setting of the flip-flop 344 take place in intervals between the inhibiting pulses from the amplifier 372 and thereby provide the desired output to the NOR circuit 358 for triggering the monostable circuit.

Until the flip-flop 342 is reset by the acknowledge signal, the output of the NOR circuit 342*a*, applied to the NOR circuit 344*b*, prevents setting of the flip-flop 344 by signals on the sense line 314. This in turn prevents triggering of the monostable circuit 360 and reloading of the register 340 until the data processor 376 has obtained the contents thereof.

The register 340 is reset by the ground level output of a NOR circuit 377. This circuit is disabled during loading of the register 340 by the ground level output of the NOR circuit 344*a* at that time, and following the resetting of the flip-flop 344 it is disabled by the ground level output of the NOR circuit 342*a*. During the short interval between the resetting of the flip-flop 344 and the setting of the flip-flop 342, an interval which coincides with the pulses on the sense line 314, operation of the NOR circuit 377 is inhibited by pulses from the amplifier 372. Thus, the reset signal is applied to the register 340 essentially from the time an acknowledge signal is received from the data processor 376 until the monostable circuit 360 is triggered to reload the register.

The circuit of FIG. 18 also includes a repeat unit 378 operating in conjunction with a repeat key 379 on the keyboard 301. This unit provides for repetition of any character selected on the keyboard whenever the repeat key is simultaneously actuated by the operator. The repeat key 379 functions in the same manner as the character-selecting buttons 12" of FIG. 15, with a core (not shown) threaded by the auxiliary drive line 320 (FIG. 19). A secondary line 380 threaded through the same core thus supplies pulses to the repeat unit 378 whenever the operator actuates the repeat key 379.

The repeat unit 378 includes an amplifier 381 to which the secondary line 380 is connected. The amplifier 381 is arranged in a threshold circuit with a potentiometer 384; the threshold level is the sense level (FIG. 21). A NOR circuit 382*a*, driven by the amplifier 381, is part of a flip-flop 382.

If the repeat key 376 is actuated beyond the threshold level of amplifier 381, the output of the NOR circuit 382*a* will shift to the positive level, thereby enabling a NOR circuit 385. If a character button 12" is then depressed and held down, the monostable circuit 360 will be triggered as described above to load the register 340. When the monostable circuit returns to its stable state, a differentiator 386 emits a pulse to the NOR circuit 385 and the output of the latter circuit sets the flip-flop 342. A data present signal is thereupon transmitted to the data processor 376.

At the same time the output of the NOR circuit 342*a* resets the flip-flop 344. Accordingly, when the flip-flop 342 is reset by the acknowledge signal and the output of the NOR circuit 342*a* returns to the positive level, the output of the amplifier 351 will once again set the flip-flop 344 and thereby trigger the monostable circuit 360. This cycle continues, with the same character being transmitted repetitively to the data processor 376 at a very fast rate, until either the character button or the repeat key 379 is released.

The flip-flop 382 is reset by the output of the monostable circuit 360 in its stable state. As long as the repeat key 379 is held down, the flip-flop will be set by pulses on the line 380 during the unstable condition of the circuit 360.

The system of FIG. 18 includes a number of features which minimize the probability of multiple-key errors. In the first place, the data lines 308 are coupled to the register 340 by way of threshold circuits in the register set to a threshold level somewhat lower in magnitude than the sense level, e.g. the termination level. Thus, if two keyboard buttons 12" are depressed substantially simultaneously, signals corresponding to both buttons cannot be loaded into the register 340 unless the second button reaches the threshold level within the relatively short period during which the register 340 is enabled by the sense line signal resulting from depression of the first button. This interval is very short; it encompasses no more than two or three clock pulses and with a clock frequency of 20,000 Hz., for example, it is extremely short compared to the time involved in button travel. Therefore, it is highly unlikely that signals corresponding to both keyboard buttons will be recorded, even though both buttons are accidentally depressed at the same time.

Additionally, the error flip-flop 356 of FIG. 18 operates in a lockout arrangement designed to prevent transmission of data to the data processor 376 when two or more character buttons are depressed within a very short interval. Specifically, when two character buttons are depressed at the same time, the signal on the sense line 314, which is the sum of the signals induced therein by each of the depressed buttons, will substantially exceed maximum value corresponding to complete depression of a single button. Ordinarily, both buttons will "bottom" and the sense line signal will almost invariably exceed a relatively large value, e.g. 175 percent of the full value for a single button. Moreover, this level, which may be termed an "error level," will be reached before the data present signal is emitted by the flip-flop 342 in response to the upstroke of the depressed buttons past the termination level (FIG. 21). Thus, transmission of an erroneous signal can be prevented in almost every case by inhibiting the NOR circuit 357 whenever the sense signal exceeds the error level and thereby preventing setting of the flip-flop 342.

This is accomplished by means of an amplifier 394 operating in conjunction with a potentiometer 395 to provide a threshold at the error level. The output of the amplifier 394 sets the error flip-flop 356 when the sense signal exceeds the error level and thereby accomplishes the desired inhibiting of the NOR circuit 357. The NOR circuit 357 remains inhibited until a keyboard button is again depressed to reload the register 340 and reset the flip-flop 356 in the manner described above.

The foregoing arrangement eliminates another type of multiple-key error. If two keys are depressed together, the combined sense line signal may reach the sense level, resulting in enabling of the register 340, prior to the time either of the two character buttons reaches the threshold level of the register 340. However, on those data lines which correspond to binary ONES for both of the depressed buttons, the combined signal may exceed the threshold level, with the register recording binary ONES for those lines only. As with errors resulting from the recording of all the ONES in the binary codes for two or more buttons, this type of error might result in the transmission of a digital signal to the data processor 376 corresponding to an undesired control function. The flip-flop 356 may actuate an audible or visible alarm when set by the signal from amplifier 394.

It will be noted that for operation of the error detection circuit, the sense line 314 should not pass through cores 302 associated with keys, such as the repeat and shift keys, that are ordinarily actuated simultaneously with character keys.

Figure 16:
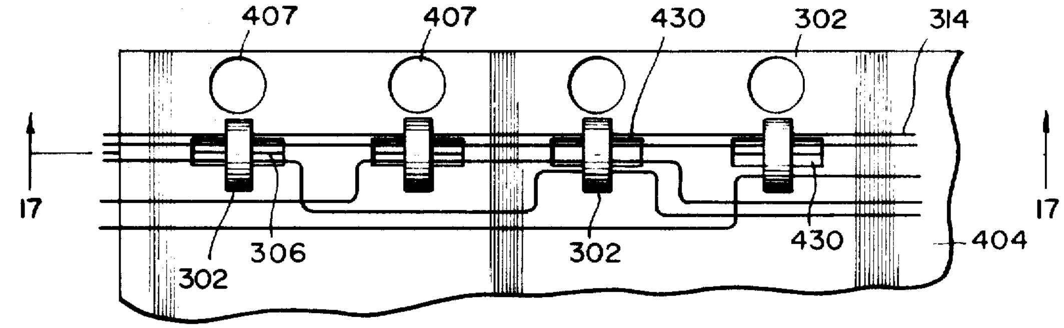
FIG. 16 is a simplified bottom view of the keyboard of FIG. 15.
Figure 17:
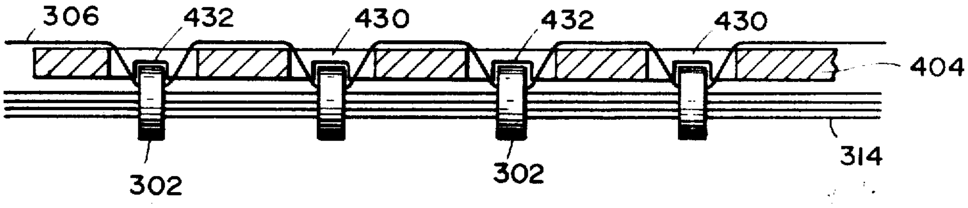
FIG. 17 is a cross section taken generally along line 17–17 of FIG. 16.

The preferred mechanical arrangement for the encoder of FIGS. 15—22 is illustrated in FIGS. 16, 17 and 22. With reference first to FIG. 22, each button 12'' is slideably mounted on a post 402 affixed to a subpanel 404 supported on a frame 408. The post 402 is preferable to a sintered material loaded with lubricant to facilitate reciprocation of a shaft 406 to which the button 12'' is secured. The post has a stub portion 402a press fitted into a corresponding aperture 407 in the subpanel 404; both the stub portion and the main portion of the post are preferably provided with a polygonal cross section to prevent rotation of the button 12'' on the post and rotation of the post with respect to the subpanel. The button 12'' is disposed in an aperture in a cover panel 410.

The lower end of the shaft 406 is reduced in diameter to provide a shoulder 412 against which a washer 414 is seated. Beneath the washer 414 are a magnet 416 and a pole piece 418, followed by a nut 420 which secures these parts in place on the shaft 406. In the normal position of the button 12'' the washer 414 bears against the subpanel 404 to serve as a stop against an upwardly acting return spring 422. The pole piece 418 conforms to the cylindrical shape of the magnet 416 and also has an integral tab 424 disposed beneath the core 302 associated with the button 12''. The core 302 is secured to the underside of the subpanel 404 in a manner to be described.

With further reference to FIG. 22, the shaft 406 has a high magnetic reluctance to avoid "short circuiting" the flux of the magnet 416. On the other hand, the washer 414, pole piece 424 and subpanel 404 are preferably of low reluctance materials, as is the core 302. Both the core 302 and the magnet 416 are preferably made of ferrite material, though with different characteristics. The magnet has a high coercive of force, whereas the core has a low coercive force and is readily saturated by the field developed by the magnet when the button 12'' is in its normal position.

More specifically, with the button 12'' in the position shown in 22, the tab 424 is closely adjacent to the core 302 and the washer 414 bears against the subpanel 404, thereby providing a relatively low reluctance path through the core 302 for the field from the magnet 416. This field is schematically indicated at 426 in FIG. 22. It is strong enough in the core 302 to saturate the core as described above and thereby prevent appreciable magnetic coupling between the driver line 306 and the data and sense lines 308 and 314 passing through the core.

When the button 12'' is depressed, the gap 305 between the washer 414 and subpanel 404 and the gap 303 between the core 302 and the pole piece tab 424 increases, thereby substantially increasing the reluctance of the magnetic path passing through the core 302 and magnetic 416. The magnetic field of the core thus decreases as does the degree of saturation of the core. The magnetic coupling between the driver line 306 and the other lines passing through the core 302 increases correspondingly along with the voltage induced in the latter lines by the current pulses in the line 306, as graphically shown in FIG. 21.

The voltage induced into the lines 308 and 314 is very sensitive to movement of the button 12''. In fact the entire range of induced voltage in the data and sense lines 308 and 314 passing through the core 302 corresponds to a vertical button movement of less than 0.2 inch.

FIGS. 16 and 17 illustrate the preferred mode of attaching the cores 302 to the subpanel 404. The subpanel is provided with a slot 430 above each of the cores and the cores are initially positioned against the slots by means of the drive line 306. Specifically, as shown in FIG. 17, the line 306 passes along the upper surface of the subpanel 404, downwardly through one of the slots 430, through the core 302 positioned at the slot, upwardly through the slot and then along the top surface of the subpanel to the next slot 430. When the drive line 306 is pulled taut it firmly engages the cores 302 against the panel 404 at the slots.

The slots 430 position the cores in the transverse direction of the subpanel 404 and small recesses 432 into which the cores fit position them in the longitudinal direction. After being temporarily secured in this fashion, the cores 302 are permanently fixed in place by the application of a resinous material, preferably one that polymerizes to a rubber consistency so as to prevent the application of undue mechanical stress to the cores. Silicone rubber and certain polyurethane compounds are examples of materials suitable for this purpose.

In the system of FIGS. 15—23, secondary windings having but a single turn ordinarily provide sufficient output voltages in the data lines 308 and sense line 314 for essentially error-free operation. However, in some cases it may be desirable to increase the induced voltages, so as to improve the accuracy of the threshold circuits. This can be readily accomplished by the use of additional turns in the secondary windings. The source impedance presented by these lines increases along with the turns ratio, but it is still small enough to prevent appreciable noise pickup in them.

The most economical method of obtaining a multiple turn arrangement for the lines 308 and 314 is to thread each of the lines once through all of the cores through which it is to pass, as in a single turn arrangement, and then repeat this process until the desired number of turns are obtained. By using the arrangement of FIG. 23, this can be accomplished with a minimum overall line length, tantamount to minimum inductance and pulse delay in the line.

More specifically, the arrangement for the data line $308^6$ is shown in FIG. 23. The transformer cores 302 are physically arranged in parallel rows according to the layout of the buttons on a typical typewriter keyboard. Proceeding from one end 450 the line extends to the right through the cores in the first row linked by it. Then it returns to the left in the second row and instead of next proceeding on to the third row, it makes a second pass through both the first and second rows. Next the line proceeds to the right through the third row from the top and then to the left through the bottom row before passing once again through the third and fourth rows to its other end 452. Cores $302_w$ corresponding to the space bar on the keyboard are conveniently included in the fourth row of cores.

By pairing rows of cores in this manner, one may materially reduce the physical length of the line $308^6$, this reduction taking place in the vertical segments of the line joining horizontal segments that pass through the respective rows of cores.

Thus the encoder of 15—22 is characterized by essentially error-free operation. This results primarily from the relatively high signal level obtained from the sensors associated with the keyboard buttons. In this connection each sensor may be defined as a saturable transformer, a single core and a single input winding preferably being common to all of the transformers associated with each button. The input or primary windings of all the transformers of the keyboard receive input power directly from the source thereof, i.e. without interposition of other elements connected in cascade with them. Also, the series connection of the sensors corresponding to each digit position in the output code causes essentially all of the voltage developed by each sensor to appear at the output terminals of the keyboard. These two factors result in a readily detected signal that is much greater in magnitude than any noise level likely to be encountered in the system. Moreover, the signal level is sufficiently great to permit the use of lower accuracy threshold level detection, thereby simplifying the system and contributing a relatively low cost.

Furthermore, each of the transformer windings may be fabricated by merely passing a wire through the transformer core, a low-cost, easily performed operation which automatically provides the desired series connection of the windings associated with the same digit position. Also, this construction results in highly desirable flexibility with regard to the code numbers assigned to the respective keyboard buttons. Even after the keyboard has been constructed, it is a relatively simple matter to reroute various conductors in order to change one or more of the code numbers. The control circuit associated with the keyboard is relatively simple and this, coupled with the construction of the keyboard itself, minimizes maintenance problems. The preferred control circuit enhances reliability by means of the hysteresis and error detection arrangements described above.

Also, because of the relatively high-speed of operation of the control circuit and also of present day data processors which may be connected to receive the information developed on the keyboard, the control circuit can be used by two or more keyboard in a time-sharing arrangement, thereby further reducing the cost of the keyboard encoder.

While I prefer to use the construction of FIGS. 15—22 specifically described above, it will be apparent that numerous changes can be made without departing from the substance of this embodiment of the invention. For example, the sense line 314 might be replaced by OR circuitry or summing networks connected to the data lines 308, though with increased cost and inferior performance of some of the functions provided by the sense line. Separate cores and input windings might be used for various sensors associated with each keyboard button, again with increased cost and also with an increase in power losses in the keyboard. Also, the mechanical construction might be varied, for example by securing the permanent magnets to the fixed structure and using the moving magnetic circuit elements associated with each key only as path-forming components for the magnetic circuit.

And the transformer cores need not have the illustrated toroidal form, though this is presently preferred because it enhances the signal level. For example, bar-shaped cores might be used, or in the ultimate, the cores might take the form of a sheet or thin film with the "windings" of each transformer located close to each other and applied to the sheet or film by "printed" circuit techniques.

Other variations, particularly in the circuit of FIG. 18, will be apparent to those skilled in the art.

In summary, a keyboard encoder embodying the present invention has a panel in which character-designating buttons are supported for movement from a normal position to an actuated position. Each button is assigned a multiple-digit binary number and has associated with it a number of sensors equal to at least the number of a selected binary digit, i.e. ONES or ZEROS, in its identifying number. Each sensor at the button, in turn, is associated with a digit position at which there is the selected binary digit in the button-identifying number.

Each sensor has an electrical element having an electrical characteristic that varies with a field acting on the element. The transfer function of the sensing element also varies with the field acting on it. The sensor also comprises a control element that moves when the associated button is depressed. The control element varies a field acting on the sensing element in accordance with the spacing between them. Where more than one sensor is associated with a button, the several control elements can be combined into a unitary element. Thus, depression of a button to select a character moves each associated control element to change the transfer function of each associated sensing element.

In the preferred embodiment of the invention magnetic sensors are used, with a saturable magnetic core having its permeability changed by the depression of a keyboard button. The sensors associated with the button comprise the core together with secondary windings whose coupling to a primary winding is altered by the change in core permeability. The various secondary windings corresponding to the same digit position in the output code number are connected together to add the respective voltage induced in them, so that the preponderance of the signal developed in any one sensor appears at the output terminals of the keyboard.

In another embodiment of the invention, a capacitive sensor described above comprises two fixed plates as the sensing element and a control element in the form of a movable plate coupling the two fixed plates together. Where several such capacitive sensors are associated with the same button, a single movable plate functions as the control element for all the sensors, and each sensing element requires only one separate fixed plate coupled with the fixed plate that forms another sensing element.

An inductive sensors wherein each sensing element is an inductor is also described. The control element changes the magnetic flux of the inductor, and thereby changes its impedance characteristic.

In another transformer arrangement described above each sensor comprises a separate transformer with a saturable core whose permeability is controlled by a depression of the keyboard button. The transformers corresponding to a digit position are connected in a cascade.

A further embodiment of the invention has no movable buttons and employs the electrical characteristics of human fingertips to change a field acting on the sensing elements.

The encoder also has a separate output device for each digit position in the set of character-identifying binary numbers. Each output device is connected with all the sensors associated with the same digit position to sense their transfer functions, and it operates as a digital converter. That is, it develops a binary signal that has a selected binary value only when the transfer function of one sensor connected with it has a value corresponding to the depressed position of the associated button.

The complete absence of moving contacts and of moving parts other than the character buttons enables the encoder to provide trouble-free operation over extended periods of use, even in adverse environments. Also, due to its mechanical simplicity and the simplicity of the electronic circuits it requires, the encoder can be highly compact.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed as new and secured by Letters Patent is:

I claim:

1. A keyboard encoder having a multiple-character keyboard on which an operator selects characters, said encoder developing a set of coded digital signals having first and second values and identifying each selected character, said encoder comprising:

A. a plurality of proximity sensors;
   1. one or more sensors being associated with each character that can be selected on said keyboard, the number of sensors associated with each character being equal to at least the number of first-value signals that the encoder produces to identify the character with which the sensors are associated,
   2. each sensor in said encoder also being associated with a digit position in the set of signals identifying the associated character,
   3. each sensor having a sensing element and having an electrical characteristic the value of which corresponds to a field acting on said sensing element, selection of the character associated with the element varying said field so that said characteristic has a first value when the associated character is being selected and a second value when that character is not being selected, B. circuit means associated with each digit position and combining said characteristics of the sensors associated with the same digit position; and C. output means producing said digital signals in response to the combined electrical characteristics.

2. A keyboard encoder according to claim 1 in which:

A. said electrical characteristic of each sensor is its impedance; and

B. said output means are responsive to the combined impedances of said sensors.

3. A keyboard encoder according to claim 1 in which:

A. said electrical characteristic of each sensor is its attenuation; and

B. said output means are responsive to the combined attenuations of said sensors.

4. In a multiple character keyboard encoder, the combination comprising:

A. means forming a plurality of electrical sensing elements each of which has a variable electrical characteristic associated with it;

the value of said characteristic corresponding to a field acting on the sensing element;

B. a plurality of manually operable field control elements, each field control element being identified by a binary number and having associated therewith a number of said sensing elements equal to at least the number of zeros or ones in said binary number; and C. said sensing elements and the field control elements associated therewith being so arranged that when each field control element is selected to select a character, the field acting on each sensing element associated with it has a value electrically distinguishable from the value when the location is not selected.

5. A keyboard encoder having a multiple-character eyboard on which an operator selects characters, said enoder developing a set of coded digital signals having first and econd values and identifying each selected character, said enoder comprising:

A. a plurality of sensors, each sensor comprising:

1. a saturable transformer core, and
2. a transformer secondary winding operatively associated with said core, B. a plurality of character-selecting keys operable to select characters, each key;

1. being identified by a character and by a corresponding binary number, and
2. being operatively associated with a number of sensors equal to at least the number of first binary digits in said binary number identifying the key, and C. a transformer primary winding operatively associated with each of said cores whereby said primary windings function as transformers with said cores and said secondary windings;

D. magnetic circuit means associated with each key, said magnetic circuit means comprising;

1. a magnet for developing a control field,
2. means for applying said control field to said sensors associated with said key, and
3. means responding to actuation of said key to vary said control field, thereby to vary the degree of saturation of the transformers associated with said key so as to vary the voltages induced in the secondary windings of these transformers, and E. means connecting in a series string the secondary windings associated with each digit position in the binary numbers corresponding to the characters identified by said keys, whereby the voltage across the ends of each string is a digit signal representing a digit in the associated digit position when a key is actuated.

. The combination defined in claim 5 in which the sensors ociated with each key include a single core and a single priry winding.

. The combination defined in claim 5:

. including a sense winding in each transformer;

. in which said sense windings are connected in series; and

. whereby the total voltage induced in said series-connected sense windings indicates the actuation of any of said keys.

. The combination defined in claim 5 including:

A. sensing means developing a sensing signal indicating the saturation of any of said cores, the magnitude of said sensing signal corresponding to the degree of actuation of any of said keys; and B. hysteresis means:

1. emitting a control signal when said sensing signal exceeds a first level, and
2. preventing repetition of said control signal until after said sensing signal has decreased below a second level substantially less than said first level.

9. The combination defined in claim 5 including

A. sensing means developing a sensing signal indicative of the voltages induced in said secondary windings, the magnitude of said sensing signal corresponding to the degree of actuation of a key on said keyboard;

B. a register connected to receive the digit signals induced in said strings of secondary windings and thereby record the code number corresponding to the character associated with an actuated key; and C. means for enabling said register to receive said digit signals only when said digit signals exceed a first level.

10. The combination defined in claim 9 including means preventing the reenabling of said register until said sensing signal decreases below a second level less than said first level.

11. The combination defined in claim 8 in which said means for developing a sensing signal comprises:

A. a further secondary winding operatively associated with each of said cores and said primary windings so as to provide an induced voltage corresponding to the degree of core saturation; and B. means connecting in series said further secondary windings in a sensing string, whereby the voltage across the ends of said sensing string is a function of the actuation of any of said keys.

12. The combination defined in claim 9 in which said means for developing a sensing signal comprises:

A. a further secondary winding operatively associated with each of said cores and said primary windings so as to provide an induced voltage corresponding to the degree of core saturation in response to current in the associated primary winding; and B. means connecting in series said further secondary windings in a sensing string, whereby the voltage across the ends of said sensing string is a function of the actuation of any of said keys.

13. A keyboard encoder having a multiple-character keyboard on which an operator selects characters, said encoder developing a set of coded digital signals having first and second values and identifying each selected character, said encoder comprising:

A. a plurality of sensors, each sensor comprising:

a transformer having:

1. a saturable core,
2. a primary winding, and
3. a secondary winding,

B. a plurality of character-selecting keys operable to select characters, each key 1. being identified by a character and by a corresponding binary number, and
2. being operatively associated with a number of sensors equal to at least the number of first binary digits in said binary number identifying the key,
3. being mounted for movement between normal and actuated positions, C. magnetic control means operated by each key; said magnetic control means comprising:

1. a magnet developing a control field,
2. means applying said control field to the transformer associated with said key when said key is in the normal position so as to saturate the transformers and induce minimum voltages in the secondary windings thereof, and 3. means operable by said key to reduce the control field in the sensors associated therewith when said key is in the actuated position, thereby to unsaturate the sensors and increase substantially the voltages induced in the secondary windings thereof;

D. means connecting in a series string the secondary windings associated with each digit position in the binary numbers corresponding to the characters identified by said keys, whereby the voltage across the ends of each string in response to current in said primary windings is a digit signal representing a digit in the associated digit position when a key is actuated.

14. The combination defined in claim 13 including sensing means providing a sensing signal indicating actuation of any of said keys, the magnitude of said sensing signal corresponding with the number of actuated keys.

15. The combination defined in claim 14 in which said sensing means comprises:

A. a further secondary winding in each of said transformers; and

B. means connecting said further secondary windings in series in a sensing string whereby the voltage induced in each of said windings in said sensing string corresponds to the displacement of one of said keys and the total voltage between the ends of said sensing string is the sum of the voltage induced in the secondary windings therein.

16. The combination defined in claim 14 including:

A. first and second flip-flops, each of said flip-flops having first and second states;

B. sensing threshold means responsive to said sensing signal to impose said first state on said first flip-flop when said sensing signal exceeds a first level;

C. pulse-forming means responsive to the shift of said first flip-flop to said second state to provide a pulse imposing said first state on said second flip-flop;

D. termination threshold means responsive to said sensing signal to provide a holding signal indicating whether or not said sensing signal exceeds a second level less than said first level, and operable to impose said second state on said second flip-flop when said sensing signal is less than said second level; and E. whereby a device receiving signal from said keyboard may respond to a data present signal indicating the first state of said first flip-flop by accepting a character from said keyboard and may acknowledge receipt of said character by shifting said second flip-flop to said second state.

17. The combination defined in claim 16 in which said sensing means comprises:

A. a further secondary winding in each of said transformers; and

B. means connecting said further secondary windings in series in a sensing string whereby the voltage induced in each of said windings in said sensing string corresponds to the displacement of one of said keys and the total voltage between the ends of said sensing string is the sum of the voltages induced in the secondary windings therein.

18. The combination defined in claim 16 including:

A. a register; and

B. means enabling said register to receive said digit signals when said first flip-flop is in said first state.

19. The combination defined in claim 18 including repeat means for repeating a character when the repeat means and the key corresponding to the character are simultaneously in the actuated position, said repeat means including:

A. a repeat key;

B. means operated by said repeat key to provide a repeat signal when said repeat key is actuated;

C. coincidence means responsive to the coincidence of:

1. said repeat signal,
2. termination of the enabling of said register to impose said first state on said second flip-flop to provide said data present signal, and D. means for imposing said second state on said first flip-flop for response to said first state of said second flip-flop, whereby upon the shifting of said second flip-flop to said second state said sensing threshold means may reimpose said first state on said first flip-flop.

20. The combination defined in claim 16 including.

A. error-indication means providing an error signal when the signal from said sensing means exceeds by a predetermined amount the signal corresponding to movement of a key to said actuated position; and B. means for inhibiting emission of said data present signal to said control unit in response to said error signal.

21. The combination defined in claim 20 in which said sensing means comprises:

A. a further secondary winding in each of said transformers; and

B. means connecting said further secondary windings in series in a sensing string whereby the voltage induced in each of said windings in said sensing string corresponds to the degree of actuation of one of said keys and the total voltage between the ends of said sensing string is the sum of the voltage induced in the secondary windings therein.

22. A keyboard encoder comprising:

A. plurality of character-selecting keys, each key corresponding to:

1. a character encoded by said encoder, and
2. movable between normal and actuated positions, B. at least one transformer associated with each key, each transformer having:

1. a primary winding,
2. a secondary winding,
3. a saturable core associated with said primary and secondary windings so as to provide a path for magnetic flux linking them, the number of transformers associated with each key corresponding to the number of first binary digits in the digital representation of the character to which the key corresponds, C. means associated with each key operable to maintain a substantially greater degree of saturation of the cores in the transformers associated with the key when the key is in the normal position than when it is in the actuated position; and D. means connecting in a secondary series string the secondary windings associated with each digit position in the digital representations of the characters to which the keys correspond, whereby the voltage across the ends of each series string is a digit signal representing a digit in the associated digit position when a key is actuated.

23. The combination in claim 22 including:

A. a panel having apertures therein,

B. said keys extending above a first side of said panel,

C. each character-selecting key being part of key assembly including:

1. a sleeve aligned with an aperture in said panel,
2. a post secured to said key and extending from said first side of said panel through said sleeve and said aperture to a second side of said panel opposite the first side,
3. a magnetic assembly comprising a magnetic member, a magnet, and a pole piece,
4. means securing said magnetic assembly on said post on the second side of said panel,
5. said pole piece having a tab extending radially therefrom,
6. the core of the transformer associated with the key being disposed between said panel and said tab,
7. return means resiliently acting on said post to urge said magnetic member against second side of said panel,
8. said pole piece, said magnetic member, and said panel having a relatively low reluctance so as to provide a path through said core for the field of said magnet whereby the magnetic field in said core substantially saturates said core when said magnetic member is adjacent to said panel, and 9. said post slidably engaging said sleeve, whereby said key can be depressed against the force of said return means, so as to move said magnetic member away from said panel and said tab away from said core, thereby to decrease the saturation of said core.

24. The combination defined in claim 22 including means connecting in a primary series string the primary windings of said transformers.

25. The combination defined in claim 24 including:

A. means for passing a current through said primary series string; and

B. means responsive to the voltages induced in said secondary series strings by said current.

26. The combination defined in claim 24 in which:

A. said transformer cores are arranged in rows;

B. each secondary winding has a plurality of turns;

C. each secondary winding string;

1. passes through those cores in a first row having windings in the string, then
2. passes through cores in a second row adjacent to the first row, thereby to form one turn in each of the windings in said string in said first and second rows, then
3. undergoes repeated passages through said first and second rows to form the remaining turns in said windings, and then
4. in similar fashion passes through cores in a third row adjacent to said second row and a fourth row adjacent to said third row to form the windings in said string in said third and fourth rows.

27. The combination in claim 24 in which:

A. each of said cores defines a closed magnetic loop;

B. each of said series strings is in the form of a conductor threaded through the cores associated with the windings in the string; and C. each winding has a single turn.

28. The combination defined in claim 27 in which all of the transformers associated with each key have:

A. a common core; and

B. a common primary winding.

29. The combination defined in claim 28 including a sense conductor threaded through all of said cores associated with said character-selecting keys.

30. The combination defined in claim 24 including means for passing periodic current pulses through said primary series string.

31. The combination defined in claim 30:

A. in which each of said series strings is in the form of a conductor passing close to the core associated with the windings in the string; and B. in which each winding has a single turn.

32. The combination defined in claim 31 in which all of the transformers associated with each key have:

A. a common core; and

B. a common primary winding.